(12) United States Patent
Bergamasco et al.

(10) Patent No.: US 8,792,352 B2
(45) Date of Patent: Jul. 29, 2014

(54) METHODS AND DEVICES FOR BACKWARD CONGESTION NOTIFICATION

(75) Inventors: Davide Bergamasco, Sunnyvale, CA (US); Andrea Baldini, San Francisco, CA (US); Valentina Alaria, San Francisco, CA (US); Flavio Bonomi, Palo Alto, CA (US); Rong Pan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 145 days.

(21) Appl. No.: 13/101,870

(22) Filed: May 5, 2011

(65) Prior Publication Data

US 2011/0273983 A1    Nov. 10, 2011

Related U.S. Application Data

(62) Division of application No. 11/248,933, filed on Oct. 11, 2005, now Pat. No. 7,961,621.

(51) Int. Cl.
 *H04J 1/16*    (2006.01)
(52) U.S. Cl.
 USPC ............ 370/236; 370/236.1; 370/236.2
(58) Field of Classification Search
 CPC .......... H04L 47/10–47/127; H04L 5/0053; H04L 12/5602
 USPC ............ 370/230.1–236, 468, 236–236.2; 709/225, 232–235, 229
 See application file for complete search history.

(56) References Cited

U.S. PATENT DOCUMENTS

| | | | |
|---|---|---|---|
| 5,402,416 | A | 3/1995 | Cieslak et al. |
| 5,526,350 | A | 6/1996 | Gittins et al. |
| 5,742,604 | A | 4/1998 | Edsall et al. |
| 5,920,566 | A | 7/1999 | Hendel et al. |

(Continued)

FOREIGN PATENT DOCUMENTS

| | | |
|---|---|---|
| CN | 1778079 A | 5/2004 |
| EP | 1 028 600 | 8/2000 |

(Continued)

OTHER PUBLICATIONS

A.K. Choudry, et al., "A New Buffer Management Scheme for Hierarchical Shared Memory Switches", IEEE/ACM Transactions on Networking, 26 pp., 1997.

(Continued)

*Primary Examiner* — Andrew Chriss
*Assistant Examiner* — Kenan Cehic
(74) *Attorney, Agent, or Firm* — Fernando Hale & Chang LLP

(57) ABSTRACT

The present invention provides improved methods and devices for managing network congestion. Preferred implementations of the invention allow congestion to be pushed from congestion points in the core of a network to reaction points, which may be edge devices, host devices or components thereof. Preferably, rate limiters shape individual flows of the reaction points that are causing congestion. Parameters of these rate limiters are preferably tuned based on feedback from congestion points, e.g., in the form of backward congestion notification ("BCN") messages. In some implementations, such BCN messages include congestion change information and at least one instantaneous measure of congestion. The instantaneous measure(s) of congestion may be relative to a threshold of a particular queue and/or relative to a threshold of a buffer that includes a plurality of queues.

16 Claims, 11 Drawing Sheets

(56) References Cited

U.S. PATENT DOCUMENTS

| | | |
|---|---|---|
| 5,946,313 A | 8/1999 | Allan et al. |
| 5,974,467 A | 10/1999 | Haddock et al. |
| 6,021,124 A | 2/2000 | Haartsen |
| 6,078,586 A | 6/2000 | Dugan et al. |
| 6,104,699 A | 8/2000 | Holender et al. |
| 6,195,356 B1 | 2/2001 | Anello et al. |
| 6,201,789 B1 | 3/2001 | Witkowski et al. |
| 6,236,652 B1 | 5/2001 | Preston et al. |
| 6,333,917 B1 | 12/2001 | Lyon et al. |
| 6,397,260 B1 | 5/2002 | Wils et al. |
| 6,404,768 B1 | 6/2002 | Basak et al. |
| 6,414,939 B1 | 7/2002 | Yamato |
| 6,415,323 B1 | 7/2002 | McCanne et al. |
| 6,456,590 B1 | 9/2002 | Ren et al. |
| 6,456,597 B1 | 9/2002 | Bare |
| 6,459,698 B1 | 10/2002 | Acharya |
| 6,504,836 B1 | 1/2003 | Li et al. |
| 6,529,489 B1 | 3/2003 | Kikuchi et al. |
| 6,556,541 B1 | 4/2003 | Bare |
| 6,556,578 B1 | 4/2003 | Silberschatz et al. |
| 6,560,198 B1 | 5/2003 | Ott et al. |
| 6,587,436 B1 | 7/2003 | Vu et al. |
| 6,611,872 B1 | 8/2003 | McCanne |
| 6,636,524 B1 | 10/2003 | Chen et al. |
| 6,650,623 B1 | 11/2003 | Varma et al. |
| 6,671,258 B1 | 12/2003 | Bonneau |
| 6,721,316 B1 | 4/2004 | Epps et al. |
| 6,724,725 B1 | 4/2004 | Dreyer et al. |
| 6,785,704 B1 | 8/2004 | McCanne |
| 6,839,794 B1 | 1/2005 | Schober |
| 6,885,633 B1 | 4/2005 | Mikkonen |
| 6,888,824 B1 | 5/2005 | Fang et al. |
| 6,901,593 B2 | 5/2005 | Aweya et al. |
| 6,904,507 B2 | 6/2005 | Gil |
| 6,917,986 B2 | 7/2005 | Mor et al. |
| 6,922,408 B2 | 7/2005 | Bloch et al. |
| 6,934,256 B1 | 8/2005 | Jacobson et al. |
| 6,934,292 B1 | 8/2005 | Ammitzboell |
| 6,946,313 B2 | 9/2005 | Gottfried |
| 6,975,593 B2 | 12/2005 | Collier et al. |
| 6,976,581 B2 | 12/2005 | Chen |
| 6,990,529 B2 | 1/2006 | Yang et al. |
| 6,999,462 B1 | 2/2006 | Acharya |
| 7,016,971 B1 | 3/2006 | Recio et al. |
| 7,020,715 B2 | 3/2006 | Venkataraman et al. |
| 7,046,631 B1 | 5/2006 | Giroux et al. |
| 7,046,666 B1 | 5/2006 | Bollay et al. |
| 7,047,666 B2 | 5/2006 | Hahn et al. |
| 7,093,024 B2 | 8/2006 | Craddock et al. |
| 7,133,405 B2 | 11/2006 | Graham et al. |
| 7,133,416 B1 | 11/2006 | Chamdani |
| 7,158,480 B1 | 1/2007 | Firoiu et al. |
| 7,187,688 B2 | 3/2007 | Garmire et al. |
| 7,190,667 B2 | 3/2007 | Susnow et al. |
| 7,197,047 B2 | 3/2007 | Latif et al. |
| 7,209,478 B2 | 4/2007 | Rojas et al. |
| 7,209,489 B1 | 4/2007 | Bailey et al. |
| 7,221,656 B1 | 5/2007 | Aweya et al. |
| 7,225,364 B2 | 5/2007 | Carnevale et al. |
| 7,246,168 B1 | 7/2007 | Bales |
| 7,266,122 B1 | 9/2007 | Hogg et al. |
| 7,266,598 B2 | 9/2007 | Rolia |
| 7,277,391 B1 | 10/2007 | Aweya et al. |
| 7,286,485 B1 | 10/2007 | Ouellette et al. |
| 7,319,669 B1 | 1/2008 | Kunz et al. |
| 7,342,934 B1 | 3/2008 | Mott et al. |
| 7,349,334 B2 | 3/2008 | Rider |
| 7,349,336 B2 | 3/2008 | Mathews et al. |
| 7,359,321 B1 | 4/2008 | Sindhu et al. |
| 7,385,997 B2 | 6/2008 | Gorti et al. |
| 7,400,590 B1 | 7/2008 | Rygh et al. |
| 7,400,634 B2 | 7/2008 | Higashitaniguchi et al. |
| 7,406,092 B2 | 7/2008 | Dropps et al. |
| 7,436,845 B1 | 10/2008 | Rygh et al. |
| 7,469,298 B2 | 12/2008 | Kitada et al. |
| 7,486,689 B1 | 2/2009 | Mott |
| 7,525,983 B2 | 4/2009 | Dropps et al. |
| 7,529,243 B2 | 5/2009 | Sodder et al. |
| 7,561,571 B1 | 7/2009 | Lovett et al. |
| 7,564,789 B2 | 7/2009 | Betker |
| 7,564,869 B2 | 7/2009 | Cafiero et al. |
| 7,596,627 B2 | 9/2009 | Cometto et al. |
| 7,602,720 B2 | 10/2009 | Bergamasco et al. |
| 7,684,326 B2 | 3/2010 | Nation et al. |
| 7,721,324 B1 | 5/2010 | Jackson |
| 7,756,027 B1 | 7/2010 | Reddy et al. |
| 7,801,125 B2 | 9/2010 | Kreeger et al. |
| 7,826,452 B1 | 11/2010 | Bishara et al. |
| 7,830,793 B2 | 11/2010 | Gai et al. |
| 7,961,621 B2 | 6/2011 | Bergamasco et al. |
| 7,996,971 B2 | 8/2011 | Newton |
| 8,121,138 B2 | 2/2012 | Miyabe |
| 8,149,710 B2 | 4/2012 | Bergamasco et al. |
| 8,160,094 B2 | 4/2012 | Cafiero et al. |
| 8,238,347 B2 | 8/2012 | DeSanti et al. |
| 8,259,720 B2 | 9/2012 | Farinacci et al. |
| 8,385,208 B1 * | 2/2013 | Medina ..................... 370/236 |
| 2001/0043564 A1 | 11/2001 | Bloch et al. |
| 2001/0048661 A1 | 12/2001 | Clear et al. |
| 2002/0023170 A1 | 2/2002 | Seaman et al. |
| 2002/0046271 A1 | 4/2002 | Huang |
| 2002/0085493 A1 | 7/2002 | Pekkala et al. |
| 2002/0085565 A1 | 7/2002 | Ku et al. |
| 2002/0103631 A1 | 8/2002 | Feldmann et al. |
| 2002/0141427 A1 | 10/2002 | McAlpine |
| 2002/0159385 A1 | 10/2002 | Susnow et al. |
| 2002/0188648 A1 | 12/2002 | Aweya et al. |
| 2002/0191640 A1 | 12/2002 | Haymes et al. |
| 2003/0002517 A1 | 1/2003 | Takajitsuko et al. |
| 2003/0016624 A1 * | 1/2003 | Bare .......................... 370/217 |
| 2003/0026267 A1 | 2/2003 | Oberman et al. |
| 2003/0037127 A1 | 2/2003 | Shah et al. |
| 2003/0037163 A1 | 2/2003 | Kitada et al. |
| 2003/0061379 A1 | 3/2003 | Craddock et al. |
| 2003/0084219 A1 | 5/2003 | Yao et al. |
| 2003/0091037 A1 | 5/2003 | Latif et al. |
| 2003/0115355 A1 | 6/2003 | Cometto et al. |
| 2003/0118030 A1 | 6/2003 | Fukuda |
| 2003/0128703 A1 * | 7/2003 | Zhao et al. .................. 370/392 |
| 2003/0152063 A1 | 8/2003 | Giese et al. |
| 2003/0169690 A1 | 9/2003 | Mott |
| 2003/0193894 A1 | 10/2003 | Tucker et al. |
| 2003/0193942 A1 | 10/2003 | Gil |
| 2003/0195983 A1 | 10/2003 | Krause |
| 2003/0202536 A1 | 10/2003 | Foster et al. |
| 2003/0223416 A1 | 12/2003 | Rojas et al. |
| 2003/0223435 A1 | 12/2003 | Gil |
| 2003/0227893 A1 | 12/2003 | Bajic |
| 2004/0008675 A1 | 1/2004 | Basso et al. |
| 2004/0013088 A1 | 1/2004 | Gregg |
| 2004/0013124 A1 * | 1/2004 | Peebles et al. ............... 370/412 |
| 2004/0024903 A1 | 2/2004 | Costatino et al. |
| 2004/0032856 A1 | 2/2004 | Sandstrom |
| 2004/0042448 A1 | 3/2004 | Lebizay et al. |
| 2004/0042477 A1 | 3/2004 | Bitar et al. |
| 2004/0076175 A1 | 4/2004 | Patenaude |
| 2004/0078621 A1 | 4/2004 | Talaugon et al. |
| 2004/0081203 A1 | 4/2004 | Sodder et al. |
| 2004/0100980 A1 | 5/2004 | Jacobs et al. |
| 2004/0120332 A1 | 6/2004 | Hendel |
| 2004/0156390 A1 | 8/2004 | Prasad et al. |
| 2004/0196809 A1 | 10/2004 | Dillinger et al. |
| 2004/0213243 A1 | 10/2004 | Lin et al. |
| 2004/0240459 A1 | 12/2004 | Lo et al. |
| 2005/0002329 A1 | 1/2005 | Luft et al. |
| 2005/0018606 A1 | 1/2005 | Dropps et al. |
| 2005/0025179 A1 | 2/2005 | McLaggan et al. |
| 2005/0044141 A1 | 2/2005 | Hameleers et al. |
| 2005/0047421 A1 | 3/2005 | Solomon |
| 2005/0060445 A1 | 3/2005 | Beukema et al. |
| 2005/0138243 A1 | 6/2005 | Tierney et al. |
| 2005/0141419 A1 | 6/2005 | Bergamasco et al. |
| 2005/0141568 A1 | 6/2005 | Kwak et al. |
| 2005/0157750 A1 | 7/2005 | Rabie et al. |

(56) References Cited

U.S. PATENT DOCUMENTS

| | | | |
|---|---|---|---|
| 2005/0169188 A1 | 8/2005 | Cometto et al. | |
| 2005/0169270 A1 | 8/2005 | Mutou et al. | |
| 2005/0190752 A1 | 9/2005 | Chiou et al. | |
| 2005/0226149 A1 | 10/2005 | Jacobson et al. | |
| 2005/0238064 A1 | 10/2005 | Winter et al. | |
| 2006/0002385 A1 | 1/2006 | Johnsen et al. | |
| 2006/0023708 A1 | 2/2006 | Snively et al. | |
| 2006/0059213 A1 | 3/2006 | Evoy | |
| 2006/0087989 A1 | 4/2006 | Gai et al. | |
| 2006/0098589 A1 | 5/2006 | Kreeger et al. | |
| 2006/0098681 A1 | 5/2006 | Cafiero et al. | |
| 2006/0101140 A1 | 5/2006 | Gai et al. | |
| 2006/0126509 A1* | 6/2006 | Abi-Nassif et al. | 370/235 |
| 2006/0146832 A1 | 7/2006 | Rampal et al. | |
| 2006/0171318 A1 | 8/2006 | Bergamasco et al. | |
| 2006/0187832 A1* | 8/2006 | Yu | 370/229 |
| 2006/0193247 A1 | 8/2006 | Naseh et al. | |
| 2006/0193252 A1 | 8/2006 | Naseh et al. | |
| 2006/0195607 A1 | 8/2006 | Naseh et al. | |
| 2006/0198323 A1 | 9/2006 | Finn | |
| 2006/0209885 A1 | 9/2006 | Hain et al. | |
| 2006/0215550 A1 | 9/2006 | Malhotra | |
| 2006/0251067 A1 | 11/2006 | DeSanti et al. | |
| 2007/0041321 A1 | 2/2007 | Sasaki et al. | |
| 2007/0047443 A1 | 3/2007 | Desai et al. | |
| 2007/0081454 A1 | 4/2007 | Bergamasco et al. | |
| 2007/0115824 A1 | 5/2007 | Chandra et al. | |
| 2007/0121617 A1 | 5/2007 | Kanekar et al. | |
| 2007/0133539 A1 | 6/2007 | Kang et al. | |
| 2007/0165632 A1 | 7/2007 | Zwiebel | |
| 2007/0183332 A1 | 8/2007 | Oh et al. | |
| 2007/0233887 A1 | 10/2007 | Nubani et al. | |
| 2007/0280207 A1 | 12/2007 | Shimizu et al. | |
| 2008/0069114 A1 | 3/2008 | Shimada et al. | |
| 2008/0089247 A1 | 4/2008 | Sane et al. | |
| 2008/0186968 A1 | 8/2008 | Farinacci et al. | |
| 2008/0212595 A1 | 9/2008 | Figueira et al. | |
| 2008/0259798 A1 | 10/2008 | Loh et al. | |
| 2008/0273465 A1* | 11/2008 | Gusat et al. | 370/236 |
| 2009/0010162 A1 | 1/2009 | Bergamasco et al. | |
| 2009/0052326 A1 | 2/2009 | Bergamasco et al. | |
| 2009/0073882 A1 | 3/2009 | McAlpine et al. | |
| 2009/0232138 A1 | 9/2009 | Gobara et al. | |
| 2009/0252038 A1 | 10/2009 | Cafiero et al. | |
| 2011/0007741 A1 | 1/2011 | Kreeger et al. | |
| 2011/0222402 A1 | 9/2011 | Gai et al. | |
| 2012/0195310 A1 | 8/2012 | Cafiero et al. | |
| 2012/0300782 A1 | 11/2012 | Farinacci et al. | |
| 2012/0307638 A1 | 12/2012 | Bergamasco et al. | |

FOREIGN PATENT DOCUMENTS

| | | |
|---|---|---|
| EP | 1206099 | 5/2002 |
| EP | 1 698 600 | 9/2006 |
| WO | WO2004/064324 | 7/2004 |
| WO | WO2006/047092 | 5/2006 |
| WO | WO2006/047109 | 5/2006 |
| WO | WO2006.047194 | 5/2006 |
| WO | WO2006/047223 | 5/2006 |
| WO | 2006/057730 | 6/2006 |
| WO | WO 2006/063922 | 6/2006 |
| WO | WO 2007/050250 | 5/2007 |
| WO | WO 2007/121101 | 10/2007 |
| WO | WO 2008/097730 | 1/2008 |
| WO | WO 2009/006573 | 1/2009 |

OTHER PUBLICATIONS

A.K. Choudry, et al., "Dynamic Queue Length Thresholds for Shared-Memory Packet Switches", IEEE/ACM Transactions on Networking, Apr. 1998.
Cisco Systems, Inc., "Cisco data Center Network Architecture and Solutions Overview," http://www.cisco.com/application/pdf/en/us/guest/netsol/ns377/c643/cdccont_0900aecd802c9a4f.pdf, 2006.
F. Kamoun, et al., "Analysis of Shared Finite Storage in a Computer Network Node Environment Under General Traffic Conditions", IEEE Transactions on Communications, Jul. 1990.
Floyd et al., Random Early Detection Gateways for Congestion Avoidance, Lawrence Berkeley Laboratory, Univ. of California, IEEE/ACM Transactions on Networking, Aug. 1993, 22 pages.
IEEE Standards 802.3ah™—2004, IEEE Computer Society, Sep. 7, 2004, 623 pages.
IEEE Standards 802.3ak™—2004, IEEE Computer Society, Mar. 1, 2004, 52 pages.
IEEE Standards 802.3™—2002, IEEE Computer Society, Mar. 8, 2002, 1538 pages.
InfiniBand Arch, Spec, vol. 1. Oct. 24, 2000 Final. Infiniband SM Trade Association.
InfiniBand Arch, Spec, vol. 2. Oct. 24, 2000 Final. Infiniband SM Trade Association.
J. Mandavi, et al., "IPPM Metrics for Measuring Connectivity", RFC 2678, pp. 1-9, Sep. 1999.
J. Moy, OSPF Version 2 (RFC 2178), Network Working Group, Cascade Communications Corp., Jul. 1997, 211 pp.
J. Postel, "Internet Control Message Protocol, DARPA Internet Program Protocol Specification", RFC 792, pp. 1-15, Sep. 1981.
K. Ramakrishnan et al., "The Addition of Explicit Congestion Notification (ECN to IP," RFC 3168, Sep. 2001.
MAC Control PAUSE Operation, 31B.1 PAUSE description, Annex 31B, IEEE Std 802.3, 1998 Edition, 11 pages.
MAC Control PAUSE Operation, 31B.3.1 Transmit Operation, Annex 31B, IEEE Std 802.3ae-2002, 4 pages.
MAC Control, IEEE Std 802.3-2002, Section Two, 9 pages.
Mekkittikul et al., A Practical Scheduling Algorithm to Achieve 100% Throughput in Input-Queued Switches, Computer Systems Laboratory, Stanford University, 1998, 8 pages.
Sancho et al.; "Analyzing the Influence of Virtual Lanes on the Performance on Infiniband Networks"; 2002; IEEE Proceeding of the International Parallel and Disctributed processing Symposium (IPDPS'02); pp. 1-10.
Wei Cao Huawei Technologies: "IEEE 802.1ah Mode for Ethernet Over MPLS; draft-cao-pwe3-801-1ah-00.txt" IETF Standard-Workingdraft, Internet Engineering Task Force, IETF, CH, Oct. 16, 2006, XP015047518 ISSN: 000-0004.
International Search Report and Written Opinion, dated Sep. 21, 2006, from PCT/US05/37069.
International Search Report and Written Opinion, dated Oct. 16, 2006, from PCT/US05/37765.
International Search Report and Written Opinion, dated Nov. 1, 2006, from PCT/US05/36700.
International Search Report and Written Opinion, dated Jan. 16, 2007, from PCT/US05/37239.
International Search Report and Written Opinion, dated Feb. 7, 2008, from PCT/US07/015506.
International Search Report and Written Opinion, dated Feb. 20, 2007, from PCT/US05/37651.
International Search Report and Written Opinion, dated Sep. 27, 2007, from PCT/US06/38858.
International Search Report and Written Opinion, dated May 23, 2008, from PCT/US08/051986.
International Search Report and Written Opinion, dated Jun. 4, 2008, PCT/US2007/066027.
International Search Report and Written Opinion, dated Oct. 15, 2008, from PCT/US08/069154.
CN Office Action mailed Jul. 31, 2009, in Chinese Application No. 200580034647.5.
CN Second Office Action mailed Feb. 5, 2010, in Chinese Application No. 200580034647.5.
CN Third Office Action mailed Aug. 11, 2010, in Chinese Application No. 200580034647.5.
CN Fourth Office Action mailed Jan. 10, 2011, in Chinese Application No. 200580034647.5.
CN Office Action mailed Aug. 8, 2008, in Chinese Application No. 200580035946.
CN Second Office Action mailed Feb. 27, 2009, in Chinese Application No. 200580035946.

(56) References Cited

OTHER PUBLICATIONS

CN Office Action mailed Jul. 18, 2008, in Chinese Application No. 200580034646.0.
CN Second Office Action mailed Jan. 15, 2010, in Chinese Application No. 200580034646.0.
CN First Office Action mailed Feb. 12, 2010, in Chinese Application No. 200580034955.8.
CN Second Office Action mailed Aug. 11, 2010, in Chinese Application No. 200580034955.8.
CN Third Office Action mailed Dec. 3, 2010, in Chinese Application No. 200580034955.8.
CN Office Action mailed Apr. 3, 2009, in Chinese Application No. 200680032204.
EPO Extended Search Report mailed Jul. 16, 2009, in EP Application No. 05810244.3.
EPO Office Action mailed Oct. 1, 2009, in EP Application No. 05810244.3.
EPO Extended Search Report mailed Jul. 13, 2009, in EP Application No. 05810800.2.
EPO Office Action mailed Oct. 19, 2009, in EP Application No. 05810800.2.
EPO Search Report mailed Mar. 19, 2010, in EP Application No. 08728248.9.
EPO Office Action mailed Jun. 18, 2010, in EP Application No. 08728248.9.
U.S. Appl. No. 10/777,886, entitled "End-to-End Congestion Control", filed on Feb. 11, 2004.
U.S. Appl. No. 60/621,396, filed Oct. 22, 2004.
US Office Action mailed Mar. 31, 2008 in related U.S. Appl. No. 11/084,587.
US Office Action mailed Oct. 28, 2008 in related U.S. Appl. No. 11/084,587.
US Office Action mailed Apr. 22, 2009 in related U.S. Appl. No. 11/084,587.
US Office Action mailed Nov. 23, 2009 in related U.S. Appl. No. 11/084,587.
US Office Action mailed Jun. 24, 2010 in related U.S. Appl. No. 11/084,587.
US Final Office Action mailed Nov. 26, 2010 in related U.S. Appl. No. 11/084,587.
US Notice of Allowance mailed Feb. 22, 2011, in related U.S. Appl. No. 11/084,587.
US Final Office Action mailed Jul. 11, 2008 in related U.S. Appl. No. 11/078,992.
US Office Action mailed Oct. 23, 2008 in related U.S. Appl. No. 11/078,992.
US Notice of Allowance mailed Mar. 23, 2009 in related U.S. Appl. No. 11/078,992.
US Office Action mailed Jul. 3, 2008 in related U.S. Appl. No. 11/400,671.
US Final Office Action mailed Mar. 17, 2009 in related U.S. Appl. No. 11/400,671.
US Office Action mailed Jun. 22, 2009 in related U.S. Appl. No. 11/400,671.
US Office Action mailed Dec. 9, 2009 in related U.S. Appl. No. 11/400,671.
US Final Office Action mailed Jun. 11, 2010 in related U.S. Appl. No. 11/400,671.
US Office Action mailed Mar. 17, 2011 in related U.S. Appl. No. 11/400,671.
US Office Action mailed Apr. 13, 2011 in related U.S. Appl. No. 12/485,337.
US Office Action mailed Feb. 21, 2008 in related U.S. Appl. No. 11/094,877.
US Office Action mailed Jul. 28, 2008 in related U.S. Appl. No. 11/094,877.
US Final Office Action mailed Dec. 10, 2008 in related U.S. Appl. No. 11/094,877.
US Office Action mailed Apr. 7, 2009 in related U.S. Appl. No. 11/094,877.
US Office Action mailed Nov. 4, 2009 in related U.S. Appl. No. 11/094,877.
US Notice of Allowance mailed Apr. 23, 2010 in related U.S. Appl. No. 11/094,877.
US Notice of Allowance mailed Jun. 28, 2010 in related U.S. Appl. No. 11/094,877.
US Office Action mailed Jan. 24, 2008 in related U.S. Appl. No. 11/152,991.
US Final Office Action mailed Sep. 8, 2008 in related U.S. Appl. No. 11/152,991.
US Office Action mailed Mar. 4, 2009 in related U.S. Appl. No. 11/152,991.
US Final Office Action mailed Aug. 18, 2009 in related U.S. Appl. No. 11/152,991.
US Notice of Allowance mailed Dec. 31, 2009 in related U.S. Appl. No. 11/152,991.
US Notice of Allowance mailed May 17, 2010 in related U.S. Appl. No. 11/152,991.
US Office Action mailed May 29, 2008 in related U.S. Appl. No. 11/155,388.
US Final Office Action mailed Sep. 15, 2008 in related U.S. Appl. No. 11/155,388.
US Notice of Allowance mailed May 29, 2009 in related U.S. Appl. No. 11/155,388.
US Notice of Allowance mailed Jul. 17, 2009 in related U.S. Appl. No. 11/155,388.
US Office Action mailed May 14, 2009 in related U.S. Appl. No. 11/248,933.
US Final Office Action mailed Dec. 28, 2009 in related U.S. Appl. No. 11/248,933.
US Office Action mailed May 13, 2010 in related U.S. Appl. No. 11/248,933.
US Notice of Allowance mailed Oct. 8, 2010 in related U.S. Appl. No. 11/248,933.
US Notice of Allowance mailed Feb. 4, 2011, in related U.S. Appl. No. 11/248,933.
US Office Action mailed Feb. 18, 2009 in related U.S. Appl. No. 11/490,806.
US Office Action mailed Nov. 12, 2009 in related U.S. Appl. No. 11/490,806.
US Final Office Action mailed Jun. 17, 2009 in related U.S. Appl. No. 11/490,806.
US Final Office Action mailed Mar. 17, 2010 in related U.S. Appl. No. 11/490,806.
US Non-Final Office Action mailed Jul. 22, 2010 in related U.S. Appl. No. 11/490,806.
US Final Office Action mailed Dec. 16, 2010 in related U.S. Appl. No. 11/490,806.
US Office Action mailed Apr. 15, 2009 in related U.S. Appl. No. 11/670,544.
US Final Office Action mailed Oct. 22, 2009 in related U.S. Appl. No. 11/670,544.
US Office Action mailed Oct. 19, 2009 in related U.S. Appl. No. 11/825,631.
US Office Action mailed Apr. 28, 2010 in related U.S. Appl. No. 11/825,631.
US Office Action mailed Oct. 29, 2010 in related U.S. Appl. No. 11/825,631.
US Office Action mailed Oct. 19, 2009 in related U.S. Appl. No. 11/842,866.
US Final Office Action mailed Apr. 2, 2010 in related U.S. Appl. No. 11/842,866.
US Office Action mailed Oct. 29, 2010 in related U.S. Appl. No. 11/842,866.
US Notice of Allowance dated May 19, 2011, issued in U.S. Appl. No. 11/084,587.
US Office Action dated Feb. 15, 2013 issued in U.S. Appl. No. 13/112,824.
US Notice of Allowanced dated Jun. 17, 2013 issued in U.S. Appl. No. 13/112,824.
US Final Office Action dated Sep. 16, 2011 issued in U.S. Appl. No. 11/400,671.

(56) References Cited

OTHER PUBLICATIONS

US Office Action dated Dec. 22, 2011 issued in U.S. Appl. No. 11/400,671.
US Notice of Allowance dated Apr. 4, 2012 issued in U.S. Appl. No. 11/400,671.
US Notice of Allowance dated Aug. 26, 2011 issued in U.S. Appl. No. 12/485,337.
US Notice of Allowance dated Dec. 13, 2011 issued in U.S. Appl. No. 12/485,337.
US Office Action dated Apr. 18, 2013 issued in U.S. Appl. No. 13/444,556.
US Office Action dated Oct. 23, 2012 issued in U.S. Appl. No. 12/885,339.
US Notice of Allowance dated May 10, 2013 issued in U.S. Appl. No. 12/885,339.
US Notice of Allowance dated Nov. 23, 2010 issued in U.S. Appl. No. 11/248,933.
US Notice of Allowance dated Nov. 18, 2011 issued in U.S. Appl. No. 11/670,544.
US Notice of Allowance dated May 1, 2012 issued in U.S. Appl. No. 11/670,544.
US Office Action dated May 26, 2011 issued in U.S. Appl. No. 11/825,631.
US Notice of Allowance dated Nov. 25, 2011 issued in U.S. Appl. No. 11/825,631.
US Office Action dated May 27, 2011 issued in U.S. Appl. No. 11/842,866.
US Notice of Allowance dated Oct. 7, 2011 issued in U.S. Appl. No. 11/842,866.
US Office Action dated Jun. 20, 2013 issued in U.S. Appl. No. 13/357,443.
EPO Extended Search Report dated Jun. 1, 2011 issued in EP Application No. 05812799.4.
India First Examination Report dated May 29, 2013, issued in IN Application No. 1348/KOLNP/2007.
EPO Office Action dated Apr. 12, 2011, issued in EP Application No. 05810244.3.
IN Office Action dated Apr. 12, 2013, issued in IN Application No. 1347/KOLN/2007.
CN Third Office Action dated Jul. 6, 2011, in Chinese Application No. 200580034646.0.
CN Fourth Office Action dated Dec. 31, 2011, in Chinese Application No. 200580034646.0.
EPO Extended Search Report dated Nov. 12, 2012 issued in EP 05 851 226.0.
IN Office Action dated Mar. 22, 2013 issued in IN Application No. 1345/KOLNP/2007.
EPO Extended Search Report dated Nov. 8, 2012 issued in EP 05 810 293.0.
EPO Office Action dated May 19, 2011 issued in EP Application No. 05810800.2.
CN First Office Action dated Apr. 3, 2009 issued in CN 200680032204.7.
CN Second Office Action dated Jan. 18, 2012 issued in Chinese Application No. 200880003496.0.
CN First Office Action dated Aug. 11, 2011 issued in Chinese Application No. 200880003496.0.
EPO Office Action dated Nov. 18, 2011, issued in EP Application No. 08728248.9.
International Search Report and Written Opinion dated Oct. 15, 2008 issued in PCT/US2008/069154.
International Preliminary Report on Patentability and Written Opinion dated Jan. 5, 2010 issued in PCT/US2008/069154.

* cited by examiner

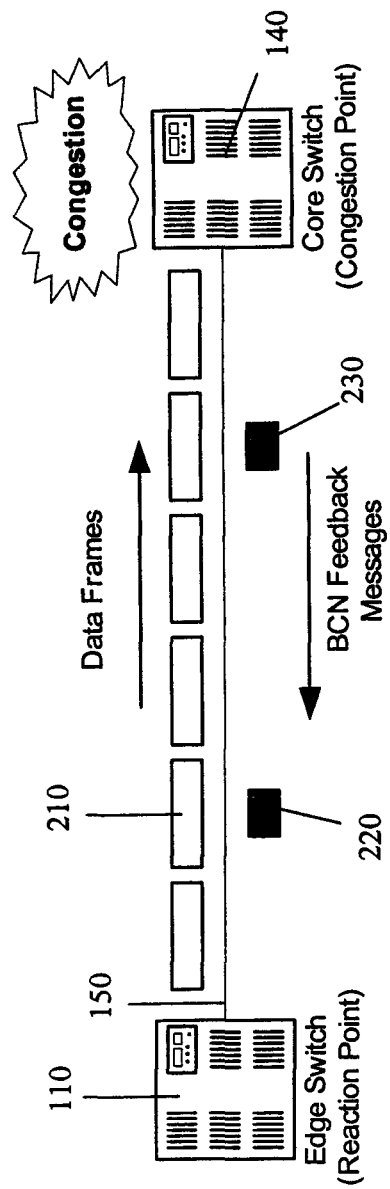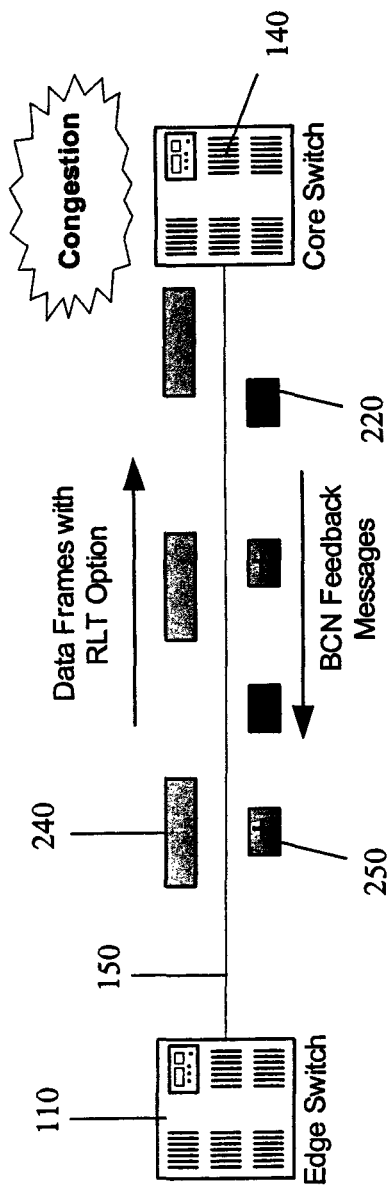

METHODS AND DEVICES FOR BACKWARD CONGESTION NOTIFICATION

CROSS-REFERENCE TO RELATED APPLICATIONS

This application is a divisional of U.S. application Ser. No. 11/248,933, entitled "Methods and Devices for Backward Congestion Notification," filed on Oct. 11, 2005, by Davide Bergamasco et al, which is incorporated herein by reference in its entirety for all purposes. The present application claims priority to and benefit of this application.

This application is related to U.S. patent application Ser. No. 11/155,388, entitled "ACTIVE QUEUE MANAGEMENT METHODS AND DEVICES" and filed on Jun. 16, 2005 (the "AQM Application"), which is hereby incorporated by reference for all purposes.

BACKGROUND OF THE INVENTION

Congestion avoidance techniques are essential to the operation of networks and network devices. One such technique known in the art as "Random Early Discard" or "RED" is described in a publication by S. Floyd and V. Jacobson entitled "*Random Early Detection Gateways for Congestion Avoidance*," (Transactions on Networking, August 1993), which is hereby incorporated by reference for all purposes.

The basic principle behind RED is to control the average length of a network device's (e.g., a router's) output queue in order to avoid long-term congestion. To achieve this goal, RED must work tightly coupled with transport protocols, such as TCP, which are equipped with their own congestion avoidance mechanisms and are thus capable to react to congestion indications generated by RED routers.

FIG. 1A includes graph 100 that illustrates how RED works. For each incoming packet, the average queue length is calculated. (Please note that the terms "packet" and "frame" may be used interchangeably herein.) If the average queue length is below a predefined minimum threshold 102, the packet is accepted and stored in the output queue for transmission. If the average queue size is above the minimum threshold 102 but below a predefined maximum threshold 104, a packet marking probability is computed and the packet gets marked according to this probability. The marking probability is proportional to the average queue size. Therefore, when the queue is larger, there is a higher probability for an incoming packet to be marked. Finally, if the average queue size is above the maximum threshold 104, all incoming packets are marked until the average queue size falls again below the maximum threshold 104.

It is responsibility of the transport protocol to take the appropriate countermeasures when it detects packets marked by RED. One explicit method of marking packets in this context is described in RFC 3168, "The Addition of Explicit Congestion Notification (ECN) to IP" (K. Ramakrishnan et al., September 2001), which is hereby incorporated by reference. When TCP is being used in the absence of an explicit method of marking packets, packets can only be "marked" by discarding them, with TCP interpreting the loss of packets as a congestion indication. When packet drops are detected, TCP sources immediately reduce their transmission rate, causing a reduction of the traffic volume at the congested router(s). Discarding packets is also a useful means to control average queue size when non-reactive transport protocols such as UDP are exploited.

As noted in the Background section of the AQM Application, the RED algorithm presents scalability issues and other challenges. Moreover, as the speed of network traffic increases, controlling network congestion in an acceptable manner becomes increasingly challenging. This is true in part because it is not economically feasible to increase buffer sizes in proportion to the higher network speeds. High speed, coupled with proportionally smaller buffer sizes and low latency, causes buffers to fill up very quickly when congestion arises.

Some exemplary high-speed, low latency networks having relatively small buffers, which will be referred to herein as Data Center Ethernet ("DCE") or the like, are described in U.S. patent application Ser. No. 11/084,587, entitled "Ethernet Extension for the Data Center" and filed on Mar. 18, 2005, to U.S. patent application Ser. No. 11/078,992, entitled "Fibre Channel Over Ethernet" and filed on Mar. 10, 2005 and to U.S. patent application Ser. No. 11/094,877, entitled "Network Device Architecture for Consolidating Input/Output and Reducing Latency" and filed on Mar. 30, 2005, (the "DCE Applications"), all of which are incorporated by reference for all purposes.

DCE networks are a challenging environment for congestion management because of their high speed (minimum 10 Gbps) and low latency (few microseconds of round trip). Also, in certain cases, such networks make use of 802.3X link-level flow control to guarantee zero packet loss to applications. If link-level flow-control is being used, congestion spreads almost instantly.

Prior art congestion control techniques such as RED and ECN have been shown to work poorly with small buffers because of the extremely compressed dynamics exhibited by such buffers. In fact, under congestion conditions a buffer in a DCE network fills up instantly when such techniques are employed, causing RED or ECN to work in the region of maximum drop/mark probability. This, in turn, causes the traffic flows to slow down more than necessary, which causes a loss of throughput.

More advanced congestion control mechanisms tailored for networks characterized by operational parameters similar to DCE have been considered. One such mechanism is Fibre Channel Congestion Control ("FCC"), a congestion management mechanism for Fibre Channel networks that is described in co-pending U.S. patent application Ser. No. 10/777,886, entitled "End-to-End Congestion Control in a Fibre Channel Network" and filed on Feb. 11, 2004, which is a continuation-in-part of co-pending U.S. patent application Ser. No. 10/026,583, entitled "Methods and Apparatus for Network Congestion Control" and filed on Dec. 18, 2001, both of which are incorporated herein by reference for all purposes.

While quite effective at controlling congestion when it arises, FCC uses a conservative, time-driven rate recovery process to accelerate traffic flows when congestion is improving. Therefore, FCC may take a longer-than-optimal time to recover the original rate of traffic flows in congested high-speed, low-latency networks such as DCE networks.

Many of the congestion management challenges of DCE networks are shared by other networks, including but not limited to Fibre Channel networks and high-speed Ethernet. It would be very desirable to implement methods and devices that address at least some of the shortcomings of the prior art.

SUMMARY OF THE INVENTION

The present invention provides improved methods and devices for managing network traffic. Preferred implementations of the invention allow congestion to be pushed from congestion points in the core of a network to reaction points, which may be edge devices, host devices or components thereof. Preferably, rate limiters shape individual flows of the reaction points that are causing congestion. Parameters of these rate limiters are preferably tuned based on feedback from congestion points, e.g., in the form of backward congestion notification ("BCN") messages. In some implementations, such BCN messages include congestion change information and at least one instantaneous measure of congestion. The instantaneous measure(s) of congestion may be relative to a threshold of a particular queue and/or relative to a threshold of a buffer that includes a plurality of queues.

Some implementations of the invention provide a congestion management method that includes the following steps: detecting network congestion at a first congestion point of a network; identifying a first congested entity of the network; calculating feedback information regarding a congestion level of the congested entity; and sending a first feedback message to a first reaction point of the network. The reaction point is associated with one or more traffic flows causing the congestion, at least in part. The feedback message includes the feedback information and identity data for the congested entity.

The feedback information may comprise an instantaneous measure of congestion and congestion change information. The instantaneous measure of congestion and the congestion change information may be determined with reference to a predetermined threshold of a queue. The predetermined threshold may decrease as a number of active virtual output queues ("VOQs") in a buffer of a congestion point increases and the first predetermined threshold may increase as the number of active VOQs in the buffer decreases.

The first feedback message may be an indication to slow down a traffic flow, an indication to speed up a traffic flow or an indication to stop a traffic flow. The first feedback message preferably identifies a particular flow. The congested entity may be a queue.

The detecting step may involve sampling a frame and determining whether a sampled frame includes data that is responsive to a feedback message. When it is determined that the sampled frame includes responsive data, the method may also include these steps: determining that the responsive data identify the first congested entity; determining that the occupancy of a queue to which the sampled frame will be added is currently above a first predetermined threshold; and sending a second feedback message to a source address of the sampled frame. The second feedback message comprises an indication to slow down a traffic flow.

When it is determined that the sampled frame includes responsive data, the method may also include these steps: determining that the responsive data identify the first congested entity; determining that the occupancy of a queue to which the sampled frame will be added is currently above a second predetermined threshold; and sending a second feedback message to a source address of the sampled frame. The second feedback message comprises an indication to stop a traffic flow.

When it is determined that the sampled frame includes responsive data, the method may also include these steps: determining that the responsive data identify the first congested entity; determining that the occupancy of a buffer of the congestion point is above a buffer congestion threshold; and sending a second feedback message to a source address of the sampled frame. The second feedback message comprises an indication that the occupancy of the buffer is above the buffer congestion threshold.

When it is determined that the sampled frame does not include responsive data, the method may further comprise the steps of determining that the occupancy of a queue to which the sampled frame will be added is currently below a first predetermined threshold and determining not to send a second feedback message to a source address of the sampled frame.

Alternative methods of the invention control rates of traffic injected into a network. One such method includes these steps: receiving a first feedback message from a congestion point of a network, the first feedback message comprising an instantaneous measure of congestion for the congestion point, congestion change information for the congestion point and identity data for the congestion point; calculating a feedback signal based, at least in part, on information in the first feedback message; and adjusting a flow rate of traffic addressed to the congestion point according to the feedback signal.

The first feedback message may identify a particular flow. The congested entity may comprise a queue. The calculating step may involve calculating the feedback signal based on the instantaneous measure of congestion and the congestion change information for the congestion point.

The first feedback message may also comprise an indication that the occupancy of a buffer of the congestion point is above a buffer congestion threshold. If so, the calculating step may involve calculating the maximum negative value of the feedback signal.

The method may include the step of adding a tag to each frame sent to the congestion point. The tag includes data responsive to the first feedback message.

All of the foregoing methods, along with other methods of the present invention, may be implemented by software, firmware and/or hardware. For example, at least some methods of the present invention may be implemented by computer programs embodied in machine-readable media. Some aspects of the invention can be implemented by network devices or portions thereof, such as an ingress port of an edge network device or an egress port of a host device's network interface card.

BRIEF DESCRIPTION OF THE DRAWINGS

FIGS. 2A and 2B illustrate different types of BCN messages between a congestion point and a reaction point.

DETAILED DESCRIPTION OF THE PREFERRED EMBODIMENTS

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

The present invention provides congestion management methods and devices that are particularly suitable for network devices, such as switches and routers. Some aspects of the present invention are particularly suitable for implementing a Data Center Ethernet ("DCE") solution, which simplifies the connectivity of data centers and provides a high bandwidth, low latency network for carrying Ethernet and storage traffic. Some exemplary DCE methods and devices are described in the DCE Applications, which have been incorporated by reference herein. However, the present invention has wide applicability outside of the DCE context and is suitable for Fibre Channel networks, IP networks, etc, potentially any kind of packet switched network.

Figure 1A:
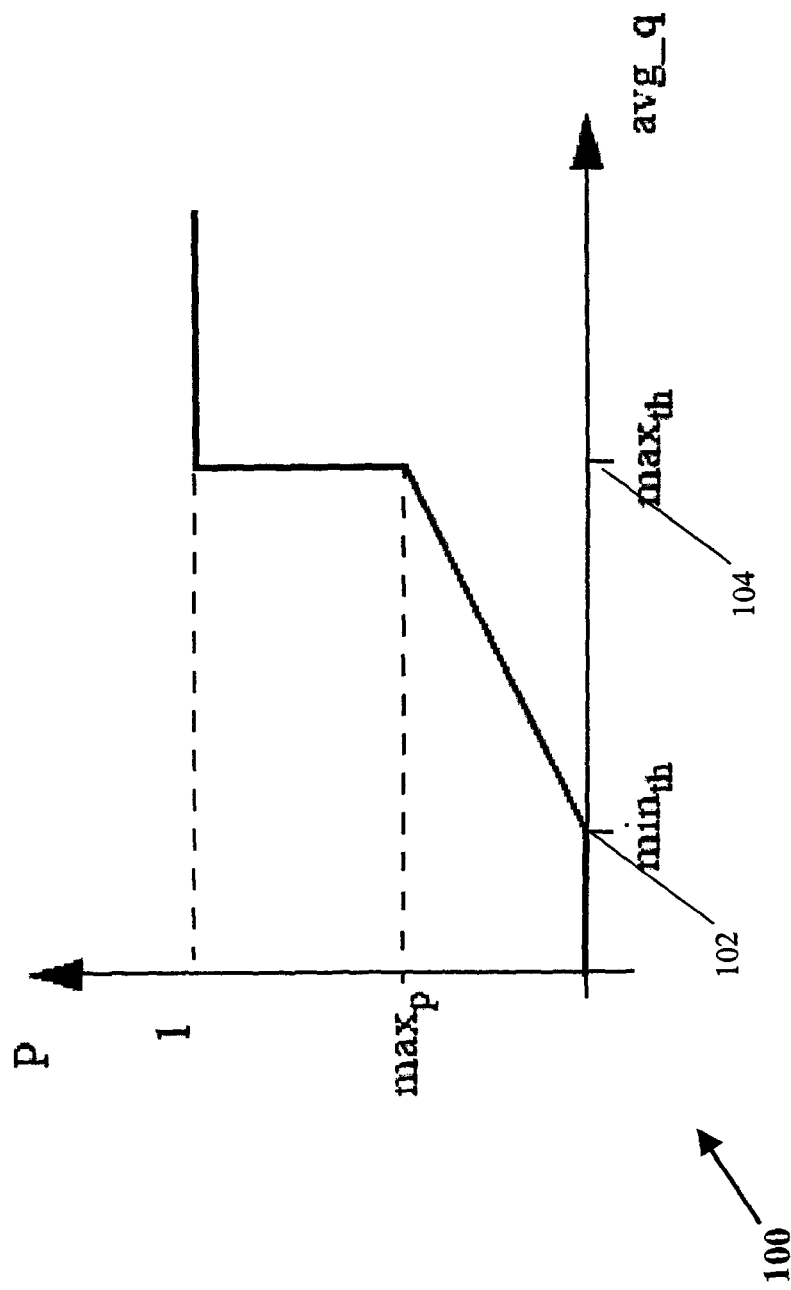
FIG. 1A is a graph illustrating the RED algorithm.
Figure 1B:
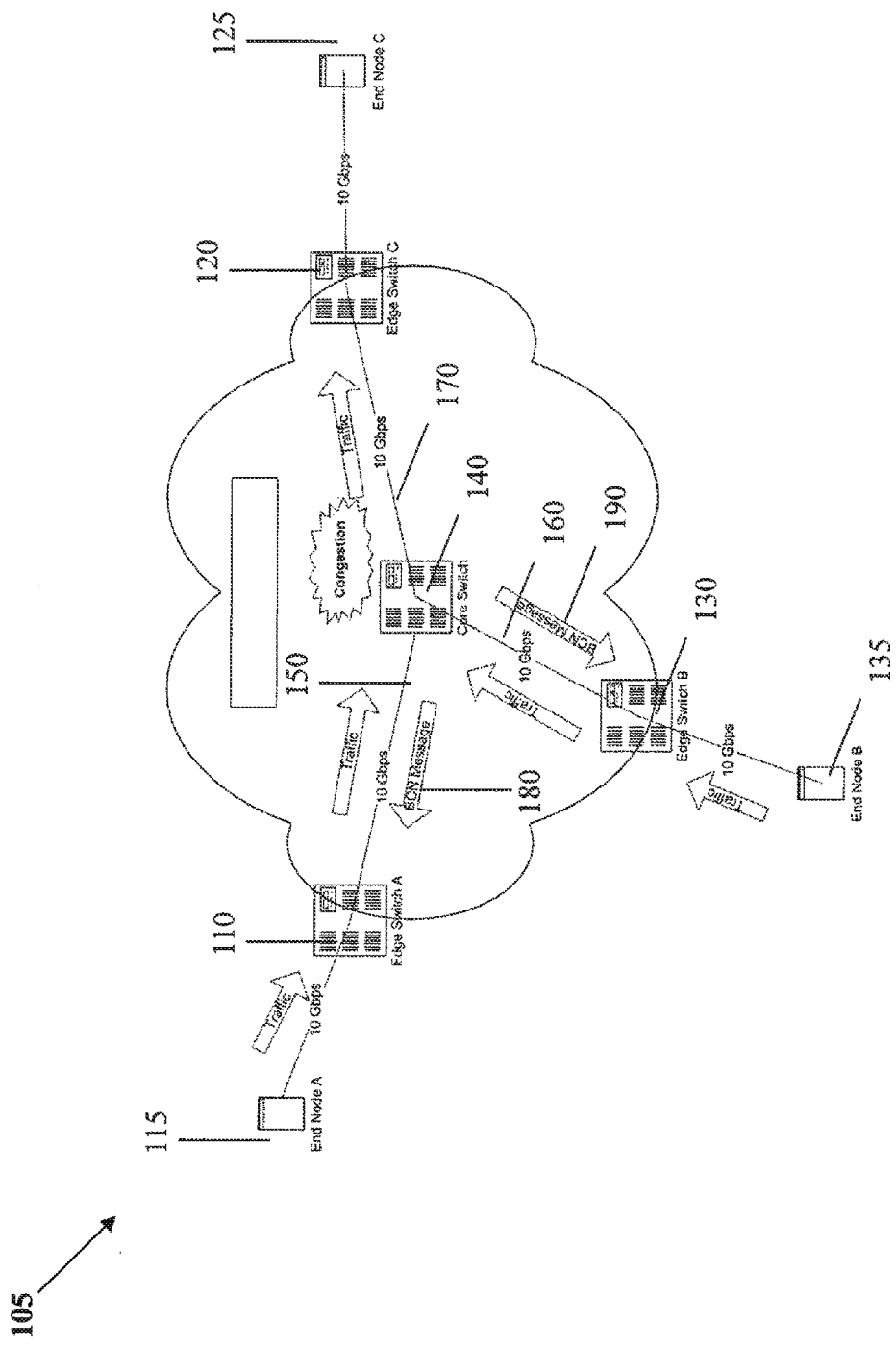
FIG. 1B is a network diagram illustrating network congestion.

FIG. 1B shows a DCE network 105 that includes core switch 140, edge switches 110, 120 and 130 and corresponding end nodes 115, 125 and 135. End nodes 115 and 135 are simultaneously sending traffic at a line rate (10 Gbps) to end node 125. Because the aggregate traffic rate from links 150 and 160 exceeds the capacity of link 170, link 170 is subject to congestion and the queue(s) associated with it start filling up. Those of skill in the art will appreciate that links 150, 160 and 170 are merely illustrative and that in some networks there may be many more links, core devices, etc., disposed between the edge switches and the core switch shown in FIG. 1B.

In this example, core switch 140 is a "congestion point" that detects the congestion condition. According to preferred implementations of the invention, as soon as a congestion point detects congestion, it starts sending explicit feedback messages to the reaction points associated with the traffic flows causing such congestion. Such feedback messages will sometimes be referenced herein as backwards congestion notification ("BCN") messages, BCN frames, or the like. In some such implementations, the feedback message is an Ethernet frame, which may have a format similar to that of the frame depicted in FIG. 3.

In this example, core switch 140 causes "slow-down" BCN messages 180 and 190 to be sent towards end nodes 115 and 135. These messages will also be referred to herein as a "negative BCN feedback messages" or the like. Such messages (and other BCN messages that are described below) are processed at "reaction points," where congestion mitigation measures are put into place. The reaction points could be edge switches 110 and 130, or, in some implementations, end nodes 115 and 135.

The processing of a negative BCN feedback message will result in the instantiation of a filter/rate limiter (or a further slow down of the one(s) already instantiated, if any) at the reaction point. The purpose of the rate limiter is to slow down a congesting traffic flow to mitigate congestion at the core switch. If congestion should improve (or dissipate completely), "speed-up" messages (also referred to herein as "positive BCN feedback messages" or the like) will cause the rate limiters to increase their rate to avoid wasting bandwidth at the congestion point.

FIGS. 2A and 2B illustrate exemplary exchanges of messages between a congestion point and a reaction point. In this example, the congestion point is core switch 140 and the reaction point is edge switch 110. In FIG. 2A, edge switch 110 is sending untagged data frames 210 to core switch 140, indicating that edge switch 110 has not yet received (or has not recently received) a BCN feedback message.

However, core switch 140 has detected congestion. First, core switch 140 has sent negative BCN feedback message 220 to a reaction point (edge switch 110), indicating that edge switch 110 should slow down its rate of transmission. Preferably, negative BCN feedback message 220 includes sufficient detail to allow edge switch 110 to identify a particular traffic flow (i.e., a layer 2 flow, a layer 3 flow, or a layer 4 flow) that needs to be slowed. A BCN frame is generated by a congestion point by sampling incoming traffic, e.g., as described below. In this example, core switch 140 has subsequently sent a "stop" BCN message 230 to edge switch 110. As described in more detail below, a "stop" BCN message 230 will cause a reaction point to stop transmitting data (preferably on a specified data flow) for a period of time.

Figure 3:
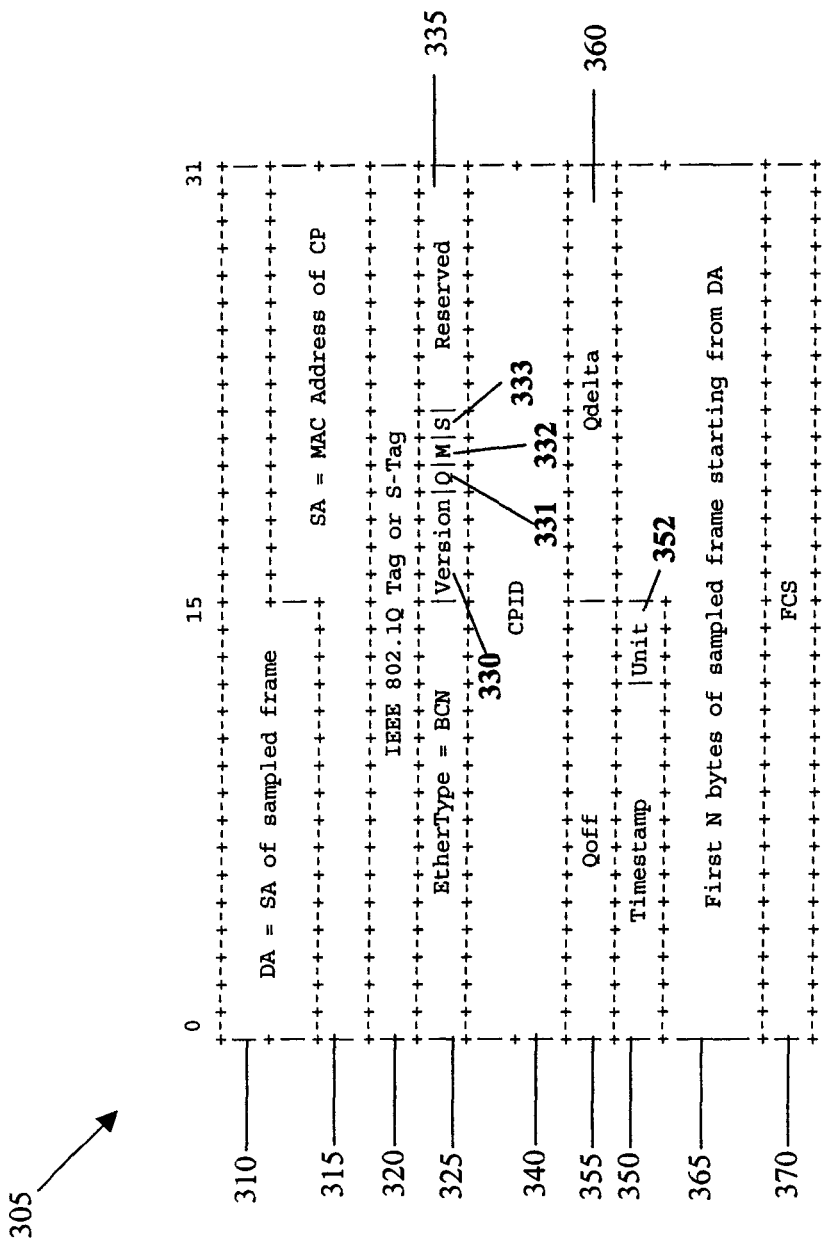
FIG. 3 illustrates an exemplary BCN frame format.

One exemplary BCN frame is depicted in FIG. 3. BCN frame 305 has a Destination Address ("DA") 310 that is equal to the Source Address of the sampled frame. BCN frame 305 also has a Source Address ("SA") 315 equal to an address (here a MAC address) associated with the congestion point. This allows BCN Frame 220 to be routed back to the source of the traffic causing congestion (in this example, to edge switch 110) with a valid source address.

In this example, field 320 is an IEEE 802.1Q tag that carries the VLAN of the sampled frame and the Priority field indicating the highest priority. Field 320 will indicate a null VLAN in two instances: (1) if the sampled frame did not carry an 802.1Q tag or (2) if the VLAN field of such tag indicated a null value. Field 325 identifies the frame as being a BCN feedback message, in this example by indicating a predetermined EtherType This EtherType could be any of the currently unassigned EtherTypes, e.g., as per http://www.iana.org/assignments/ethernet-numbers. These EtherTypes are assignable by the IEEE Standards Department, 445 Hoes Lane, P.O. Box 1331, Piscataway, N.J. 08855-1331.

Version field 330 indicates the version of the BCN protocol. In this example, three bits following version field 330 change the semantics of the BCN message when they are set. The meaning of these bits will be described below. Q bit 331 indicates that Qdelta is saturated. In the example described below, Qdelta is saturated when its value is either equal to −2Qeq or −2Qeq. M bit 332 indicates a condition of mild congestion, whereas S bit 333 indicates a condition of severe congestion. Reserved bits in field 335 are not used in this example. Instead, they are set to zero on transmission and ignored on reception. Future versions of the BCN protocol may redefine all or some of the reserved bits.

Field 340 indicates a congestion point identifier ("CPID"). A primary purpose of the CPID is to identify a congested entity in the network. In this example, the congested entity is a queue of core switch 140. This information is sent to a reaction point in order to create an association between the congested entity and the reaction point.

The contents of timestamp field 350 and unit field 352 are copied from the homonymous fields of a Rate Limited Tag ("RLT") of the sampled frame. RLTs will be described below with reference to FIGS. 2B and 4. If the sampled frame does not carry such a tag, timestamp field 350 and unit field 352 are set to zero.

Qoff field 355 and Qdelta field 360 contain quantitative feedback information conveyed by the congestion point to the reaction point. The use of such fields will be described below with reference to FIG. 6.

Field 365 of BCN frame 305 consists of the first N bytes of the sampled frame. N is a configurable parameter, and it has a minimum value is such that the resulting BCN frame is always guaranteed to be as large as, or larger than, a minimum-sized frame of the type used to implement the invention (e.g., a minimum-sized Ethernet frame of 64 bytes). For example, in the case of BCN frame 305 of FIG. 3, the minimum value of N has to be 26 in order to ensure the length of BCN frame 305 to be 64 bytes or larger. The information in field 365 conveys to the reaction point enough information to exert highly focused congestion mitigation actions. For example, a reaction point may use source and/or destination IP addresses and TCP ports from field 365 to identify specific traffic flows and alter the corresponding transmission rates. Field 370 is the Frame Check Sequence or CRC of the BCN frame 305.

Figure 5:
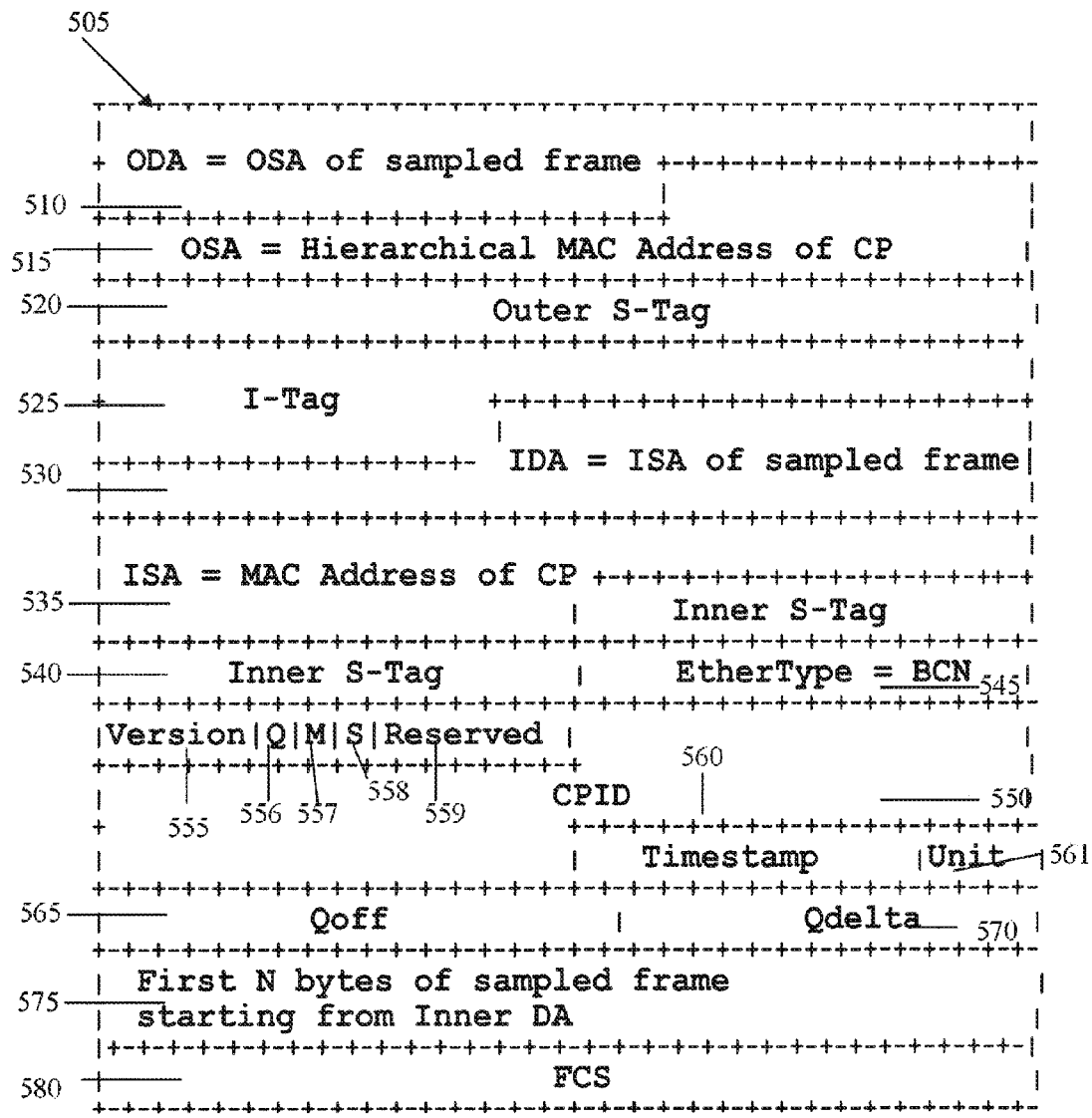
FIG. 5 illustrates an exemplary BCN frame format with MAC-in-MAC encapsulation.

FIG. 5 illustrates an example of an extended BCN frame 505 that may be used in networks employing MAC-in-MAC encapsulation. Such methods may be implemented, for example, according to a conventional MAC-in-MAC scheme as described in IEEE standard draft 802.1 ah or according to novel methods described in U.S. patent application Ser. No. 11/152,991, entitled "FORWARDING TABLE REDUCTION AND MULTIPATH NETWORK FORWARDING" and filed on Jun. 14, 2005, both of which are hereby incorporated by reference.

BCN frame 505 includes outer destination address field 510, which indicates the outer source address of the sampled frame. Field 515 indicates the outer source address of the congestion point, which is a hierarchical MAC address in this example. Field 520 indicates the outer S-Tag (the outer IEEE 802.1Q tag) of the sampled frame. Field 525 indicates that frame 505 is a MAC-in-MAC frame.

Field 530 indicates the inner destination address, which is the inner source address of the sampled frame. Fields 535 through 580 correspond generally with fields 315 through 370 of BCN frame 305. The VLAN field of the inner and outer S-Tags 540 and 520 (a.k.a. B-Tag in 802.1ah) should be the same as the VLAN field of the 802.1Q field of the sampled frame. The priority field of the outer S-Tag 520 should be set to the highest level of priority, while the same field of the inner S-Tag 540 is the priority field of the sampled packet.

FIG. 2B illustrates exemplary exchanges of messages that may occur when a reaction point has already received one or more BCN frames from a congestion point. Here, edge switch 110 has previously received BCN frames from core switch 140. Additional BCN frames are en route, including positive BCN feedback message 250 and another negative BCN feedback message 220.

When edge switch 110 receives a BCN frame from congestion point 140 and such message is intended to cause a congestion mitigation action to be undertaken on a particular data flow (e.g., the installation of a rate limiter or the slowing down of an existing one), edge switch 110 stores a CPID in a local register associated with such data flow. All the frames 240 belonging to that flow that are subsequently injected by edge switch 110 in the network will carry a Rate Limited Tag ("RLT") containing the CPID.

Figure 4:
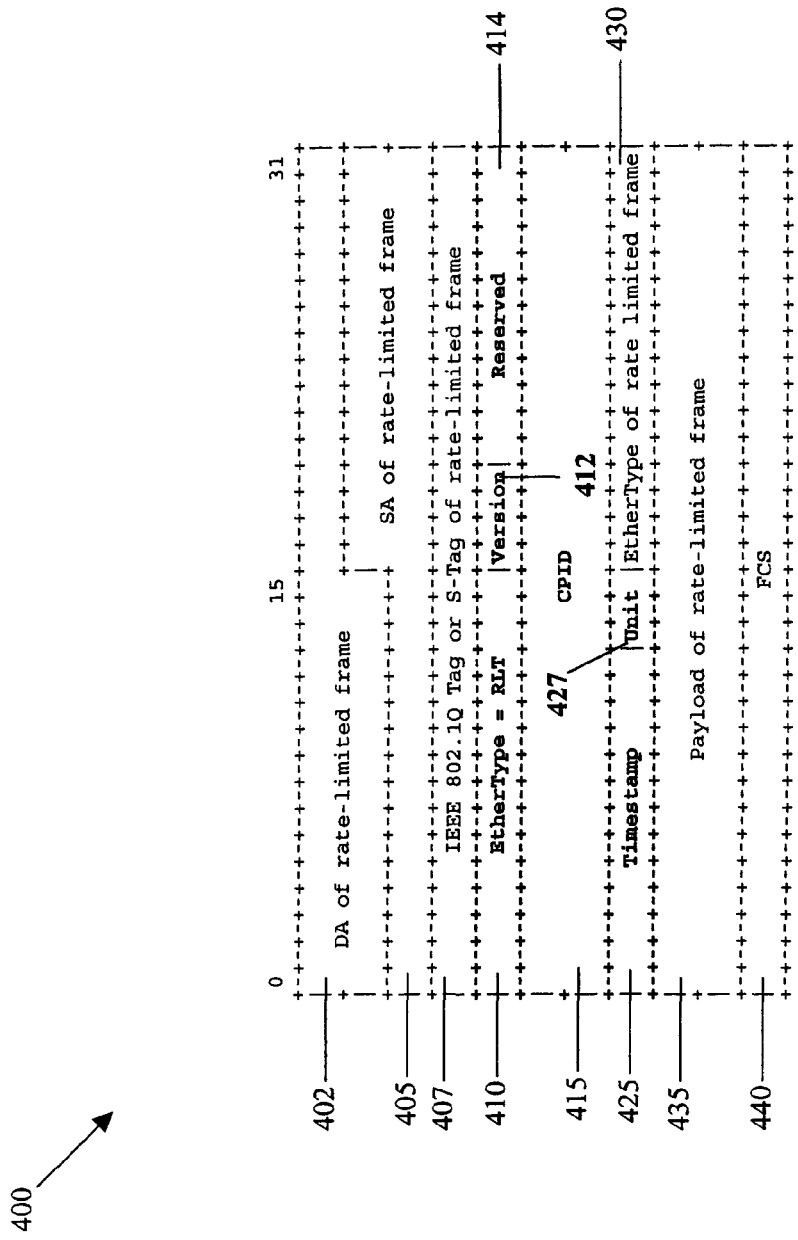
FIG. 4 illustrates an exemplary Rate Limited Tag ("RLT") frame format.

One exemplary rate-limited frame 400 is illustrated in FIG. 4. Fields 402 and 405 indicate the destination address and source address, respectively, of rate-limited frame 400. Field 407 indicates the S-Tag value of rate-limited frame 400.

Fields 410 through 427, shown in bold in FIG. 4, comprise an RLT in this example. Field 410 indicates that the tag is an RLT. In this example, the RLT tag is identified by a predetermined value in EtherType field 410. Version field 412 and Reserved field 414 have the same meaning as the 330 and 335, respectively, of BCN frame 305.

CPID field 415 indicates the congestion point to which the RLT pertains. This information may be used to complete the association between a reaction point and the corresponding congestion point. One important purpose of this association is to prevent a reaction point from receiving positive feedback from multiple congestion points for the same flow. Preferably, a congestion point will generate BCN feedback messages only on flows whose frames that carry an RLT tag with a CPID matching its own ID. As noted above, when a reaction point receives a BCN frame from a congestion point and such message causes a congestion mitigation action to be undertaken on a particular data flow, the reaction point associates the CPID with the data flow, e.g. by saving the CPID in a local register associated with such data flow. Field 420 is reserved.

Timestamp field 425 may be used to estimate the round trip time between the reaction point and the congestion point with which it is associated. Each time a reaction point inserts an RLT tag in a frame it is going to transmit, the current value of a local free running timer is copied into timestamp field 425. Unit field 427 indicates the time units used by the free running timer. The resolution of this free running timer may be, for example, a value in the range 1 μs to 100 μs. As noted above, when a frame having an RLT tag is sampled by a congestion point, the contents of timestamp field 425 and unit field 427 are copied and inserted in timestamp field 350 and unit field 352 of a BCN frame generated by the congestion point.

Figure 6:
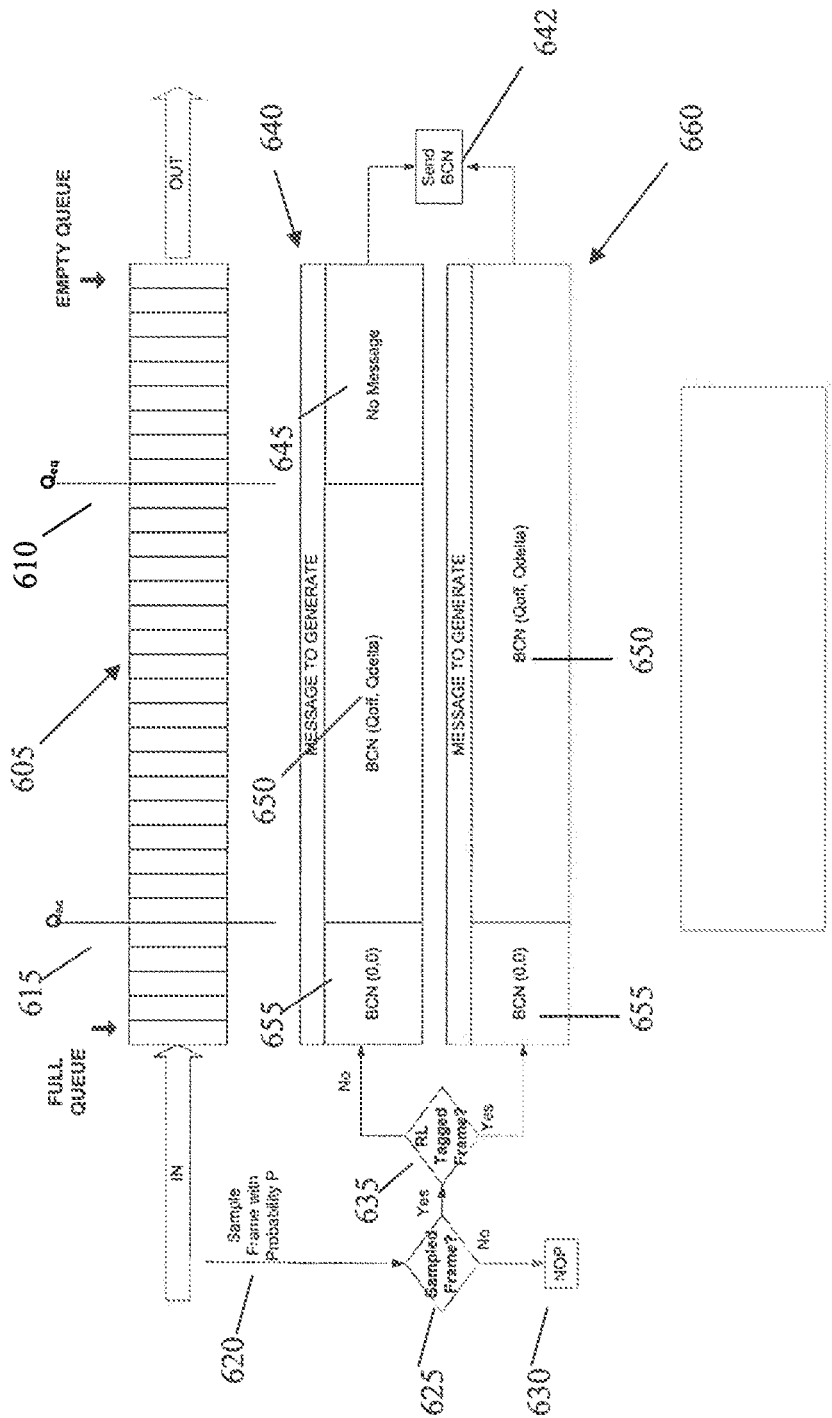
FIG. 6 illustrates exemplary processes of congestion detection and message generation at a congestion point.

Exemplary methods for congestion detection and for generating BCN frames at a congestion point will now be described with reference to FIG. 6. Queue 605 is a queue of a congestion point. An equilibrium threshold Qeq 610 defines a desired operating point of a queue under congestion conditions. In other words, Qeq 610 establishes a target level around which the length of queue 605 should oscillate when congestion arises. A severe congestion threshold Qsc 615 defines the level at which the queue is subject to extreme congestion conditions.

Incoming frames are sampled with a certain probability P 620. P 620 is a configurable parameter, the selection of which is a tradeoff between the usefulness of more frequent congestion detection and the overhead required for more frequent sampling and computation. In some preferred implementations, P 620 is in the range of 0.001 to 0.1; in some such implementations, P 620 is 0.01. The values of Qeq 610, Qsc 615 and P 620 should be established before the other steps shown in FIG. 6 are performed.

In step 625, a congestion point determines whether or not to sample a frame. If no frame is sampled, no BCN frame will be generated at that moment. When a frame is sampled, the process continues to step 635, wherein the sampled frame is evaluated.

In this example, when the length of queue 605 is below Qeq, the treatment of sampled frames will differ according to whether the sampled frame carries an RLT tag having a CPID that identifies the congestion point. If the sampled frame does not carry such an RLT tag and the length of the queue below Qeq, no BCN Frame is generated (message generation scheme 640) and sent (step 642). However, if the sampled frame does carry such an RLT tag and the length of the queue below Qeq, a BCN Frame is generated (message generation scheme 660) and sent (step 642).

In other words, in this implementation, if the sampled frame carries an RLT tag the congestion point generates a BCN frame irrespective of the current queue length if and only if its congestion point identifier matches the CPID field in the RLT tag. When such a match occurs, the timestamp field of the RLT tag is copied into the corresponding field of the BCN Frame.

In this implementation, when the queue length is above Qeq, the Congestion Point will generate either a regular BCN feedback message or a "stop" BCN feedback message irrespective of the CPID field in the RLT tag. In this example, if the length of queue 605 is ≥Qeq and is ≤Qsc, a negative BCN feedback message is generated whether or not the packet carries an RLT tag, and whether or not the CPID of the RLT tag (if any) matches the congestion point ID. A "stop" BCN feedback message is generated when the length of the queue is >Qsc.

In this example, a BCN feedback message includes two fields, Qoff and Qdelta. Qoff is an instantaneous measure of congestion, which in this example is the offset of the current queue length with respect to the equilibrium threshold Qeq. Here, Qoff is saturated at +Qeq and −Qeq. Here, a BCN feedback message also includes congestion change information. Here, the congestion change information is Qdelta, which is the change in length of the queue since the last sampled frame. In this example, Qdelta is saturated at +2Qeq and −2Qeq. When Qdelta saturates, the Q bit in the BCN Frame is set. A "stop" BCN feedback message is indicated by zero values for Qoff and Qdelta. In fact, since a BCN message is not generated when a frame is sampled and Qoff and Qdelta are both zero, this combination may be used to identify a "stop" BCN message.

Qdelta may be calculated according to at least two methods. In the first method, Qdelta is the difference between the current queue length and the queue length at the previous time of sampling. In a second method, Qdelta is the difference between the number of packets (or other data units) added to the queue and the number of packets (or other data units) removed from the queue since the last time of sampling. The first method is more accurate but requires that an indication of the previous queue length be stored in memory. The second method requires a smaller amount of state to be kept, but may be prone to error accumulation.

Figure 7:
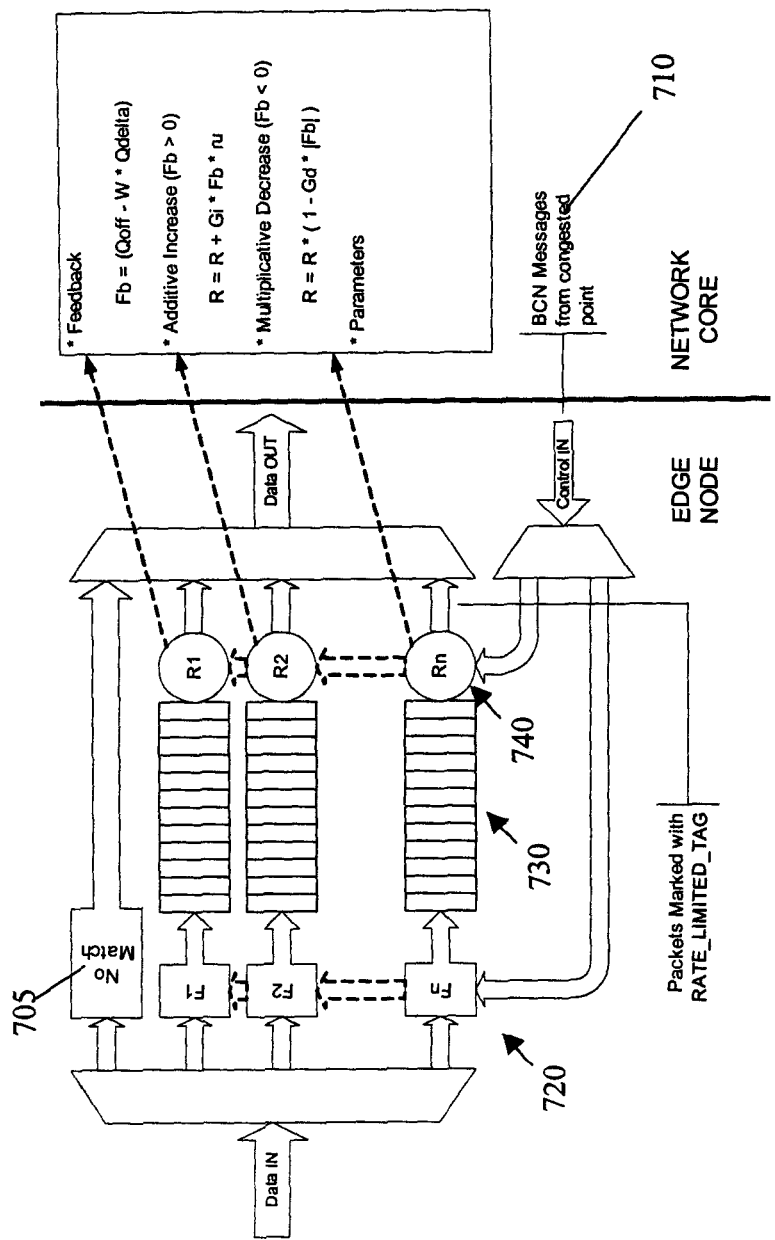
FIG. 7 illustrates an exemplary data path structure of a reaction point.

FIG. 7 illustrates the structure of the data paths of a reaction point according to some implementations of the invention. This process may be implemented, for example, in an ingress port of an edge switch or in an egress port of the network interface card ("NIC") of a host device. Data path 705 represents a condition of the reaction point before any BCN frames have been received indicating congestion that pertains to this reaction point, e.g., as in the state of edge device 110 in FIG. 2A. In data path 705, un-tagged data frames, like those of data frames 210 of FIG. 2A, are transmitted by the reaction point.

After BCN frames have been received indicating congestion that pertains to this reaction point (e.g., as in the state of edge device 110 in FIG. 2B), a set of filters 720, F1 through Fn, divert the traffic that matches a particular filtering criterion (e.g., L2 SA-DA, L3 SA-DA, etc.) from data path 705 to a set of queues. Traffic is drained from such queues by a set of corresponding rate limiters 740, R1 through Rn, whose rate is controlled by the BCN Frames coming from congestion points. Besides controlling the rate of traffic, in this implementation the rate limiters also cause an RLT tag to be added to all the frames they transmit in order to elicit feedback from the congestion points. To ensure that the feedback is generated only by the congestion point that originally caused the instantiation of the filter, the RLT tag contains the identity of such congestion point ("CPID"). Congestion points should include their identity in every BCN Frame they generate, so that each of filters 720 may be associated with individual congestion points.

According to some implementations of the invention, the rate control algorithm used by rate limiters 740 works according to a Feedback Signal Fb that is calculated, e.g., according to Equation (1):

$$Fb = Q\text{off} - w \cdot Q\text{delta} \quad \text{Equation (1)}$$

In Equation (1), w is a parameter used to weight the derivative component Qdelta (which is also referred to herein as the congestion change component or the like) more or less with respect to the offset component Qoff (which is also referred to herein as the instantaneous measure of congestion or the like). The values of Qoff and Qdelta are determined from BCN frames received by a reaction point. Based on the sign of the Feedback Signal Fb, in some implementations of the invention the rate R is increased or decreased as follows:

$$\text{If } Fb > 0 \ R = R + Gi \cdot Fb \cdot Ru \quad \text{Equation (2)}$$

$$\text{If } Fb < 0 \ R = R \cdot (1 - Gd \cdot |Fb|) \quad \text{Equation (3)}$$

If Fb=0, R is unchanged. Here, Gi and Gd are the Increase Gain and Decrease Gain respectively, and Ru is the Rate Unit (i.e., the granularity of the rate adjustment) employed by the rate limiters. In one example, Gi=1, Ru=8 Mbps and Gd=1/64. However, these values are merely exemplary and the variables of Equations (2) and (3) may be optimized according to the implementation. The calculations are preferably done in the reaction point. In alternative implementations, the calculations are done elsewhere, e.g., in the detection point. However, if the calculations are performed in a location other than the reaction point, the most effective use of timestamps will be inhibited.

It will be observed that in implementations that use equations in the general form of Equations (2) and (3) to control changes in R, the rates are decreased more aggressively when Fb<0 (a multiplicative decrease) than the rates are increased when Fb>0 (an additive increase). This is desirable in order to avoid filling the buffers of a congestion point too quickly due to a slow response to detected congestion or due to a too-rapid increase in flow when congestion is abating.

A limited number of filters/rate limiters may be available. There may be cases when all the filters have been used and a BCN message is received which should cause the instantiation of a new filter/rate limiter pair. In such cases, a number of actions may be taken, e.g.: (1) aggregate all the filters/rate limiters in a single filter/rate limiter that controls the entire traffic originated by and end system; (2) aggregate filters/rate limiters in an "intelligent" way, e.g., use the same filter/rate limiter for all the traffic flows sharing the same destination address, etc; or (3) aggregate filters/rate limiters in a "less intelligent" way, e.g., use the same filter/rate limiter for all the traffic flows sharing the same bucket based on an hash function of the frame header.

When a reaction point receives a BCN Frame, the difference between the current time and the time indicated in the timestamp field of the BCN Frame is calculated. This difference is the last measure of the round trip time between the reaction point and the congestion point. This measure may be averaged out, for example using an Exponential Weighted Moving Average similar to the one used by WRED, and used to dynamically adjust the value of some of the reaction parameters. For example, a reaction point may have a number of tables containing different values of the w, Gi, and Gd parameters precalculated based on different round-trip times. The current value of the averaged round-trip time may be used to select the table of parameters that best suite the current loop delay.

Once a rate limiter has been instantiated, it may be reclaimed once two conditions are satisfied: (1) the queue of the rate limiter is empty, and (2) its rate is at or above the line-rate. These two conditions are necessary to avoid out of order packet delivery.

Each rate limiter is associated with a timer that is reset every time a BCN Frame is received. If this timer expires, it means that the corresponding rate limiter has not received BCN Frames for the entire duration of the timeout period. This may happen, for example, because the traffic stream that that rate limiter was controlling has suddenly ended. Alternatively, this may occur because routing issues in the network are preventing BCN Frames from reaching the reaction point. To reclaim a rate limiter that may potentially be stale, various implementations of the invention employ a variety of solutions. In some implementations, the rate limiter is immediately freed up at the timeout expiration. In other implementations, the rate of the rate limiter starts automatically increasing when the timer expires. This increase may continue, for example, until the conditions for the filter reclaiming are met or BCN frames are eventually received. In other implementations, management software is notified (e.g., via an interrupt) of the anomaly and the management software is allowed to deal with the issue.

Rate limiters use a certain amount of buffer space to store frames held in their queues. Therefore, an active queue management mechanism may advantageously be used to prevent such buffers from overflowing. Traditional AQM techniques such as RED do not work well in such conditions because of the limited buffer and flow dynamics. An alternative AQM algorithm of the present invention may be implemented as follows. First, a threshold $Q_{aqm}$ is associated with the rate limiter queues. If the length of a rate limiter queue is below the $Q_{aqm}$ threshold, no action is taken. If the length of the rate limiter is above the $Q_{aqm}$ threshold, a packet is dropped/marked with a certain fixed probability (e.g., a probability in the range of 0.1 to 0.001).

If reactive and non-reactive flows (such as TCP and UDP flows) are sharing the same rate limiter queue, two separate packet counters are introduced. One packet counter is used for counting reactive packets in and the other for non-reactive packets stored in the queue. The AQM algorithm described in the previous paragraph could be implemented in the same way, except that for non-reactive flows the drop probability is 1.

An active filter 720 may change its association with a congestion point over time. The association can be changed when a negative BCN Frame is received from a congestion point different from the one currently associated with the filter. For example, if a traffic flow is subject to congestion at congestion point CP1 (and therefore is filtered and rate-controlled according to feedback from CP1) starts experiencing congestion at congestion point CP2, CP2 will generate negative a BCN frame for that flow, causing its filter to change association from CP1 to CP2. After some time, the negative feedback generated by one of the two congestion points will prevail and the filter will settle its association with that congestion point.

When a congestion point is subject to severe congestion, it may send a "stop" BCN feedback message. Such a message is also referred to herein as a "BCN0" message or the like because in some implementations a "stop" BCN feedback message is a BCN message with Qoff=0 and Qdelta=0.

Figure 8:
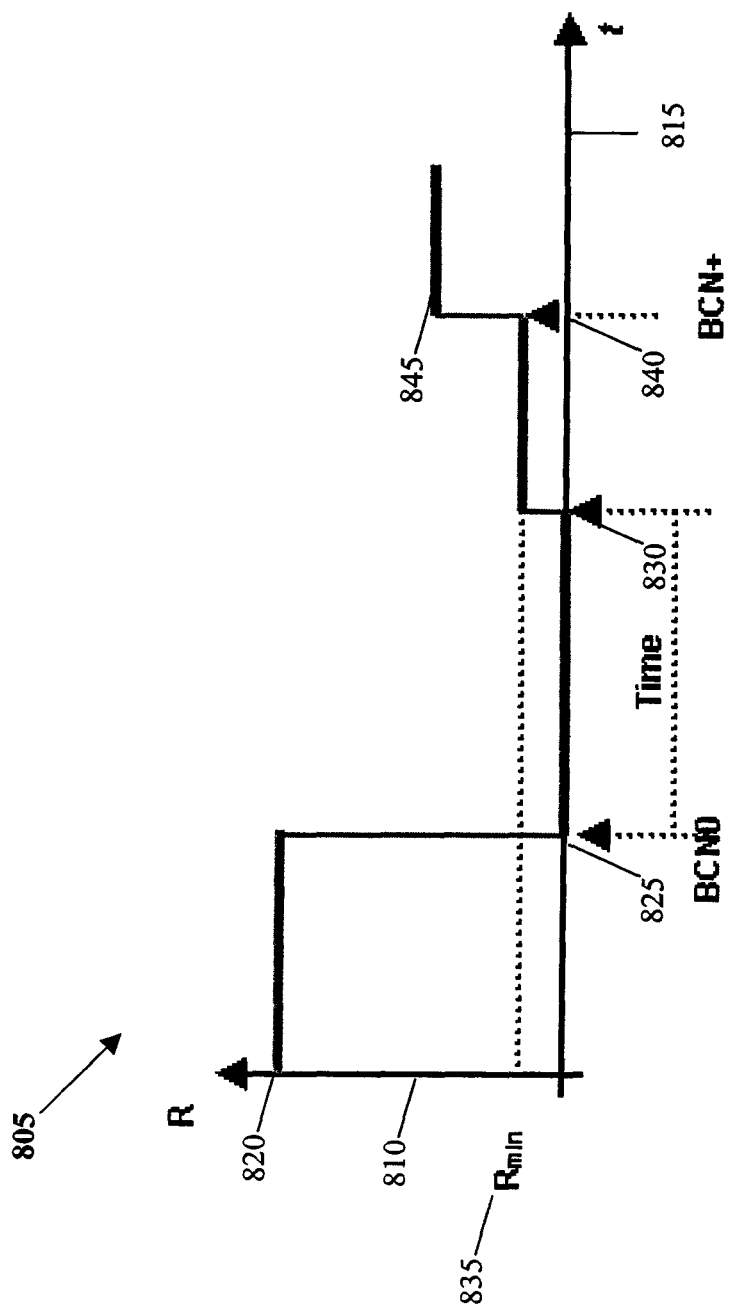
FIG. 8 illustrates an example of timeout and restart at a reaction point.

Referring now to graph 805 of FIG. 8, transmission rates are indicated with respect to vertical axis 810 and time is indicated with respect to horizontal axis 815. When a rate limiter receives a "stop" BCN feedback message (at time 825), in some implementations of the invention it sets its current rate 820 to 0 and starts a timer, e.g., a random timer whose range is determined by time $T_{max}$ (e.g., 10 us). When the timer started by the BCN0 message expires, the rate limiter is set to operate at a minimum rate 835, which is a minimum rate $R_{min}$ in this example (e.g., ¹/₁₀ of line rate). This should restart the traffic flow towards the congestion point and trigger—hopefully positive—feedback. In this example, the slow restart leads to positive feedback from the congestion point at time 840 and a subsequent increase in R to rate 845.

After the timer expiration, Tmax is doubled and Rmin is halved, so that the next BCN0 will cause the random timer to have a longer duration and the rate limiter to restart from a slower rate, effectively realizing an exponential back-off. The initial values of Tmax and Rmin are restored upon the reception of the first positive feedback. During the timeout period, i.e., while the random timer is running, all BCN messages, including BCN0, must be ignored.

The same timer may be used if, for any reason, the rate of a rate limiter becomes smaller that $R_{min}$. When this happens, the random timer is started. When it expires, the rate of the rate limiter is set to $R_{min}$.

Special handling of the BCN message is required when any of the Q bits is set in the BCN Frame. When this bit is set, the Qdelta parameter is saturated at 2Qeq or −2Qeq. When this happens, a stronger rate adjustment must be performed because the system is working outside of the linear region. The saturation feedback signal is calculated as follow:

$$Fb_{sat} = -2 \cdot \left( \frac{Qdelta}{2} + w \cdot Qdelta \right)$$

The rate adjustment is then performed as usual, i.e.:
If $Fb_{sat}$>0 R=R+Gi·$Fb_{sat}$·Ru
If $Fb_{sat}$<0 R=R·(1−Gd·|$Fb_{sat}$|)
The saturation feedback generates a rate adjustment twice as big as the maximum rate adjustment.

It will often be the case that a queue considered herein is part of a VOQ system wherein an unpredictable number of queues may be sharing a common buffer at any given time. In such circumstances, it may be beneficial to tune or modify the previously-described methods of the present invention according to the state of the VOQ system and the associated buffer. The larger the number of VOQs sharing the same physical or logical buffer, the lower the equilibrium threshold $Q_{eq}$ should be kept. Accordingly, some implementations of the invention provide a dynamic equilibrium threshold $Q_{eq}$ that responds to such conditions by decreasing $Q_{eq}$ as the number of active VOQs increases and increasing $Q_{eq}$ as the number of active VOQs decreases.

Moreover, the more that a common buffer is congested, the stronger the reaction implemented by the reaction points should be. In some implementations of the invention, the overall occupancy of a buffer will override the previously-described methods for implementing BCN messages according to indications from individual queues. One such implementation will now be described with reference to FIG. 9.

Figure 9:
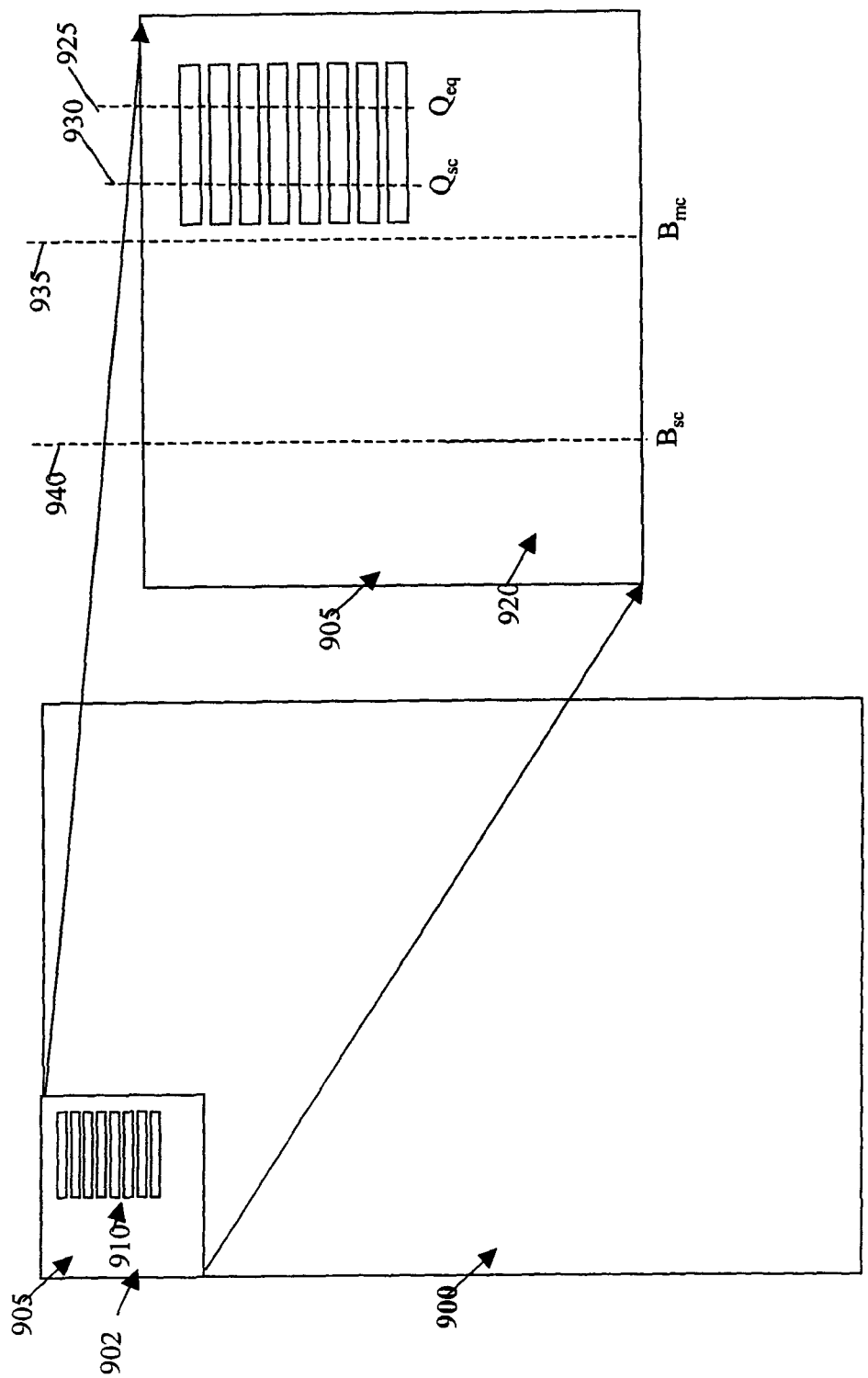
FIG. 9 depicts an alternative implementation for congestion points having input buffers that are shared by a number of output queues.

FIG. 9 depicts core switch 900 having an input buffer 905 for port 902. Core switch 900 is a congestion detection point. Here, input buffer 905 is shared by a number of output queues 910. When the overall occupancy of buffer 905 reaches a predetermined level, "slow down" or "stop" BCN indications will result, even when no individual queue is experiencing congestion.

In this example, when the occupancy of buffer 905 increases beyond mild congestion threshold ("$B_{mc}$"), the M bit will be set in the BCN frame (e.g., in reserved area 335 of frame 305 (see FIG. 3)). The reaction point (e.g., an edge switch) will detect that the M bit has been set and will double the effect of any negative feedback. Positive feedback sent from a congestion point according to the condition of an individual queue with the M bit set will be ignored.

When the severe congestion threshold ("$B_{sc}$") is crossed, the S bit will be set in the BCN frame. If the reaction point detects that the S bit has been set, the reaction point will translate any corresponding BCN indication to be a "stop" BCN indication and will respond accordingly.

Figure 10:
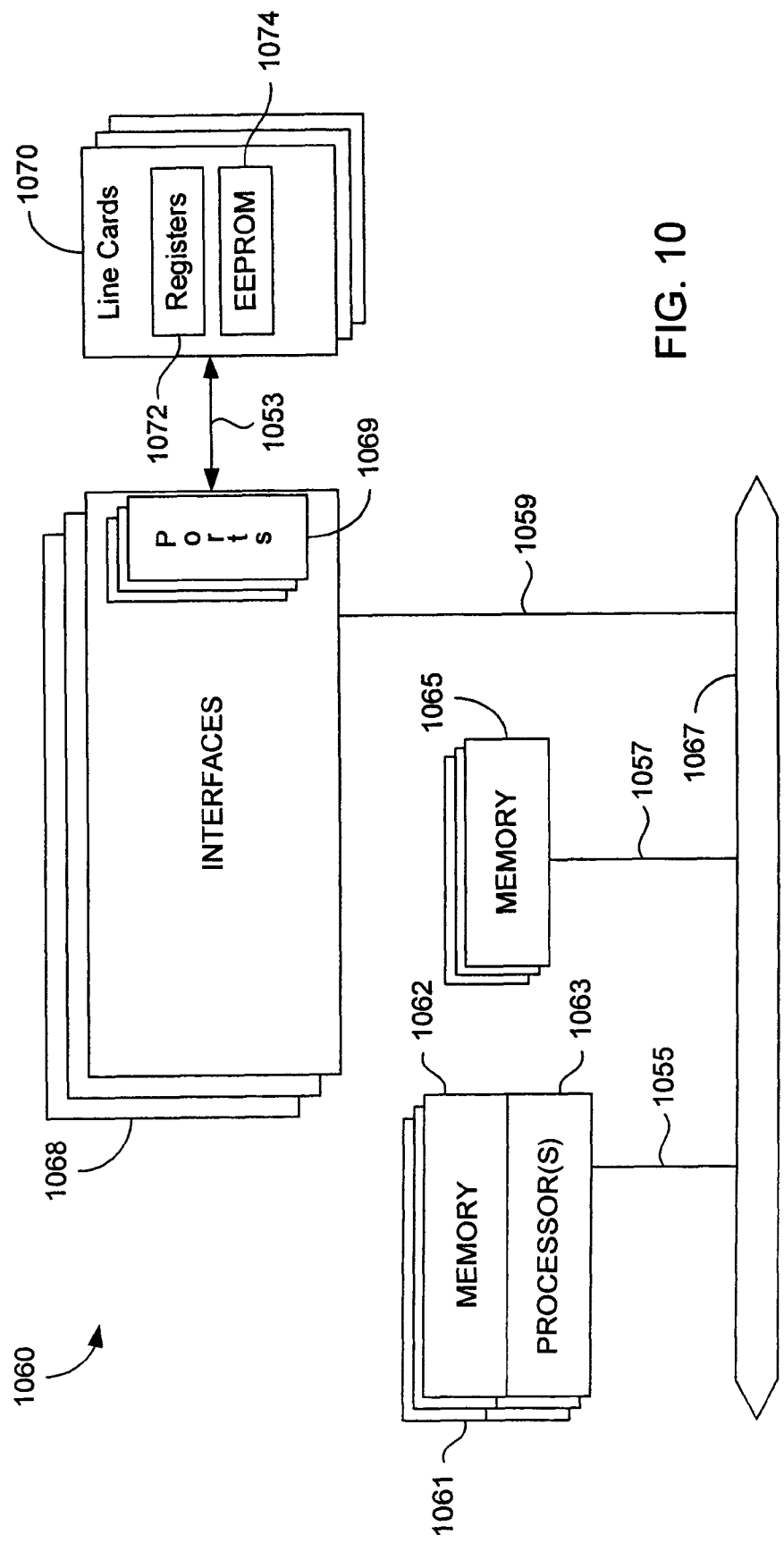
FIG. 10 is a network device that may be configured to implement some aspects of the invention.

FIG. 10 illustrates an example of a network device that may be configured to implement some methods of the present invention. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor 1074 and, in some instances, volatile RAM. Independent processors 1074 may be, for example ASICs or any other appropriate processors. According to some such embodiments, these independent processors 1074 perform at least some of the functions of the logic described herein. In some embodiments, one or more of interfaces 1068 control such communications-intensive tasks as media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "line cards"). Generally, interfaces 1068 control the sending and receiving of data packets over the network and sometimes support other peripherals used with the network device 1060. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system (e.g. Linux, VxWorks, etc.), and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 10 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 10) or switch fabric based (such as a cross-bar).

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. A method of controlling a rate of traffic injected into a network, the method comprising:
   receiving a first feedback message from a congestion point of a network, the first feedback message comprising an Ethernet frame having embedded therein:
      an instantaneous congestion value in a first field of the Ethernet frame;
      a congestion change value in a second field of the Ethernet frame, the second field being separate from the first field; and
      a congestion point identifier associated with the congestion point;
   calculating a rate control value based, at least in part, on the instantaneous congestion value and the congestion change value; and
   adjusting a flow rate of traffic addressed to the congestion point according to the rate control value.

2. The method of claim 1, wherein the Ethernet frame includes an EtherType field value that identifies the Ethernet frame as a backwards congestion notification message.

3. The method of claim 1, wherein the Ethernet frame includes first and second congestion condition bits, wherein the first congestion condition bit indicates whether mild congestion is present, and the second congestion condition bit indicates whether severe congestion is present.

4. The method of claim 1, wherein the first feedback message further comprises an indication that an occupancy of a buffer of the congestion point is above a buffer congestion threshold, wherein calculating the rate control value comprises calculating a maximum negative value of the rate control value.

5. The method of claim 1, further comprising adding a tag to frames sent to the congestion point, the tag including data responsive to the first feedback message.

6. An apparatus for controlling a rate of traffic injected into a network, comprising:
   a processor; and
   a memory, at least one of the processor or the memory being configured for:
      receiving a first feedback message from a congestion point of a network, the first feedback message comprising an Ethernet frame having embedded therein:
         an instantaneous congestion value in a first field of the Ethernet frame;
         a congestion change value in a second field of the Ethernet frame, the second field being separate from the first field, the congestion change value indicating a change in an amount of congestion at the congestion point; and
         a congestion point identifier associated with the congestion point;
      calculating a rate control value based, at least in part, on the instantaneous congestion value and the congestion change value; and
      adjusting a flow rate of traffic addressed to the congestion point according to the rate control value.

7. The apparatus of claim 6, wherein the first feedback message identifies a network flow.

8. The apparatus of claim 6, wherein the first feedback message further comprises an indication that an occupancy of a buffer of the congestion point is above a buffer congestion threshold, wherein said calculating step the rate control value comprises calculating a maximum negative value of the rate control value.

9. The apparatus of claim 6, at least one of the processor or the memory being further configured for adding a tag to frames sent to the congestion point, the tag including data responsive to the first feedback message.

10. A device for controlling a rate of traffic injected into a network, the device comprising:
    means for receiving a first feedback message from a congestion point of a network, the first feedback message comprising an Ethernet frame having embedded therein:
       an instantaneous congestion value in a first field of the Ethernet frame;
       a congestion change value in a second field of the Ethernet frame, the second field being separate from the first field; and
       a congestion point identifier associated with the congestion point;
    means for calculating a rate control value based, at least in part, on the instantaneous congestion value and the congestion change value;
    means for adjusting a flow rate of traffic addressed to the congestion point according to the rate control value; and
    means for adding data responsive to the first feedback message to frames sent to the congestion point.

11. The device of claim 10, wherein the device comprises an ingress port of an edge switch.

12. The device of claim 10, wherein the device comprises an egress port of a host device.

13. A congestion management method, comprising:
    detecting network congestion at a first congestion point of a network
    identifying a first congested entity of the network;
    determining a current queue level of the congested entity;
    sending a first feedback message to a first reaction point of the network, the first reaction point being associated with one or more traffic flows at least partly causing the congestion, the first feedback message comprising an Ethernet frame having embedded therein:
       an instantaneous congestion value in a first field of the Ethernet frame;
       a congestion change value in a second field of the Ethernet frame, the second field being separate from the first field; and
       a congestion point identifier associated with the congested; and
    determining whether the congestion change value exceeds a predetermined threshold;
    wherein the predetermined threshold decreases as a number of active virtual output queues ("VOQs") in a buffer of the first congestion point increases and wherein the predetermined threshold increases as the number of active VOQs in the buffer decreases.

14. The method of claim 1, wherein the congestion change value is associated with a change in length of a queue.

15. The method of claim 1, wherein the congestion change value indicates a change in a level of congestion since a previous time.

16. The method of claim 1, further comprising adding data responsive to the first feedback message to frames sent to the congestion point.

* * * * *